US 8,510,534 B2

(12) United States Patent
Van Berkel et al.

(10) Patent No.: US 8,510,534 B2
(45) Date of Patent: Aug. 13, 2013

(54) SCALAR/VECTOR PROCESSOR THAT INCLUDES A FUNCTIONAL UNIT WITH A VECTOR SECTION AND A SCALAR SECTION

(75) Inventors: Cornelis Hermanus Van Berkel, Eindhoven (NL); Patrick Peter Elizabeth Meuwissen, Eindhoven (NL); Nur Engin, Eindhoven (NL)

(73) Assignee: ST-Ericsson SA, Plan-les-Ouates (CH)

( * ) Notice: Subject to any disclaimer, the term of this patent is extended or adjusted under 35 U.S.C. 154(b) by 772 days.

(21) Appl. No.: 10/515,451

(22) PCT Filed: May 22, 2003

(86) PCT No.: PCT/IB03/02213
§ 371 (c)(1),
(2), (4) Date: Nov. 22, 2004

(87) PCT Pub. No.: WO03/100602
PCT Pub. Date: Dec. 4, 2003

(65) Prior Publication Data
US 2005/0240644 A1    Oct. 27, 2005

(30) Foreign Application Priority Data

May 24, 2002   (EP) .................................. 02077034

(51) Int. Cl.
*G06F 15/00*   (2006.01)
*G06F 15/76*   (2006.01)

(52) U.S. Cl.
USPC ........................................................... 712/3

(58) Field of Classification Search
USPC ............................................................. 712/3
See application file for complete search history.

(56) References Cited

U.S. PATENT DOCUMENTS

| 4,760,518 | A |   | 7/1988  | Potash et al. |
|-----------|---|---|---------|---------------|
| 4,964,035 | A | * | 10/1990 | Aoyama et al. ................... 712/3 |
| 4,987,534 | A | * | 1/1991  | Sekiguchi ......................... 712/3 |
| 5,053,987 | A | * | 10/1991 | Genusov et al. .............. 708/520 |
| 5,197,130 | A | * | 3/1993  | Chen et al. ........................ 712/3 |
| 5,261,113 | A | * | 11/1993 | Jouppi .............................. 712/8 |
| 5,426,754 | A |   | 6/1995  | Grice et al. |

(Continued)

FOREIGN PATENT DOCUMENTS

| EP | 1102163 A2 | 5/2001 |
|----|------------|--------|
| JP | 4293151 A  | 10/1992 |

(Continued)

OTHER PUBLICATIONS

Asanovic et al.; SPERT: A VLIW/SIMD Neuro-Microprocessor; 1992; IJCNN '92; pp. 577-582, vol. 2.*

(Continued)

*Primary Examiner* — Corey S Faherty
(74) *Attorney, Agent, or Firm* — Coats & Bennett, P.L.L.C.

(57) ABSTRACT

A scalar/vector processor includes a plurality of functional units (252, 260, 262, 264, 266, 268, 270). At least one of the functional units includes a vector section (210) for operating on at least one vector and a scalar section (220) for operating on at least one scalar. The vector section and scalar section of the functional unit co-operate by the scalar section being arranged to provide and/or consume at least one scalar required by and/or supplied by the vector section of the functional unit.

15 Claims, 6 Drawing Sheets

(56) References Cited

U.S. PATENT DOCUMENTS

| | | | |
|---|---|---|---|
| 5,430,884 A * | 7/1995 | Beard et al. | 712/3 |
| 5,506,998 A | 4/1996 | Kato et al. | |
| 5,659,706 A | 8/1997 | Beard et al. | |
| 5,742,842 A * | 4/1998 | Suetake et al. | 712/3 |
| 5,745,721 A | 4/1998 | Beard et al. | |
| 5,872,987 A * | 2/1999 | Wade et al. | 712/3 |
| 2003/0037221 A1* | 2/2003 | Gschwind et al. | 712/3 |

FOREIGN PATENT DOCUMENTS

| | | |
|---|---|---|
| JP | 05502958 A | 5/1993 |
| JP | 2001184339 A | 7/2001 |
| JP | 2001256038 A | 9/2001 |

OTHER PUBLICATIONS

International Search Report dated Oct. 4, 2004 in connection with PCT Application No. PCT/IB03/02213.

* cited by examiner

SCALAR/VECTOR PROCESSOR THAT INCLUDES A FUNCTIONAL UNIT WITH A VECTOR SECTION AND A SCALAR SECTION

FIELD OF THE INVENTION

The invention relates to a scalar/vector processor.

BACKGROUND OF THE INVENTION

Third generation wireless communication standards, such as UMTS/FDD, TDD, IS2000, and TD-SCDMA, operate at very high frequencies. Modems (tansceivers) for 3G mobile communication standards such as UMTS require approximately 100 times more digital signal processing power than GSM. It is desired to implement a transceiver for such standards using a programmable architecture in order to be able to deal with different standards and to be able to flexibly adapt to new standards. Using conventional DSP technology operating at conventional frequencies could require as many as 30 DSPs to provide the necessary performance. It will be clear that such an approach is neither cost-effective nor power efficient compared to conventional hardware-based approaches of transceivers for single-standards.

A known approach to increasing performance of a processor is to use a vector architecture. In a vector processor, a vector consists of more than one data element, for example sixteen 16-bit elements. A functional unit of the processor operates on all individual data elements of the vector in parallel, triggered by one instruction. Using a pipelined vector processor, the performance can be increased further.

Vector processors have traditionally mainly been used for scientific processing. In principle, vector processors can also be used for signal processing. However, the conventional vector processor architecture is ineffective for applications that are not 100% vectorizable, due to the implications of what is known as "Amdahl's Law". This law states that the overall speedup obtained from vectorization on a vector processor with P processing elements, as a function of the fraction of code that can be vectorized (f), equals $(1-f+f/P)^{-1}$. This means that when 50% of the code can be vectorized, an overall speedup of less than 2 is realized (instead of the theoretical maximum speedup of 32). This is because the remaining 50% of the code cannot be vectorized, and thus no speedup is achieved for this part of the code. Even if 90% of the code can be vectorized, the speedup is still less than a factor of 8. For use in consumer electronics applications, in particular mobile communication, the additional costs of a vector processor can only be justified if a significant speed-up can be achieved.

SUMMARY OF THE INVENTION

It is an object of the invention to provide a processor architecture that is better suitable for high-performance tasks, in particular signal processing for mobile communication systems.

To meet the object, a scalar/vector processor includes a plurality of functional units, where at least one of the functional units includes a vector section for operating on at least one vector and a scalar section for operating on at least one scalar, the vector section and scalar section of the functional unit co-operating by the scalar section being arranged to provide and/or consume at least one scalar required by and/or supplied by the vector section of the functional unit.

The inventors have realized that in order to break through Amdahls law it is necessary that the also the non-vectorizable part of the data must be handled in an efficient way. The non-vectorizable part deals with scalar data. Often these scalars are produced and/or consumed by vector operations. Examples are: sum or max of all elements of the vector, select first (or last) vector element In other cases, the scalar data may be independent of the vector operations. To deal optimally with such scalar data, at least one functional units of the processor not only includes a vector section but also includes a scalar section. The scalar section provides and/or consumes a scalar required by and/or supplied by the vector section of the functional unit. In this way, the scalar part of the processor can prepare or further process scalar(s) required for or produced by the vector part, ensuring that the vector part can better continue streamed processing of vectors. It should be noted that U.S. Pat. No. 5,659,706 describes a scalar/vector processor with a separate scalar processor part and a vector processor part. Each of the processor parts is arranged in functional units. However, there is no close co-operation between a functional unit of the scalar processor part and a functional unit of the vector processor part. Both parts operate fully independently.

As described in the dependent claims 2 and 3, the vector sections and scalar sections, respectively, of the functional units are arranged in respective pipelines. This increases the performance of the vector and scalar parts of the processor.

As described in the dependent claim 4, the pipelines can be configured independently. This enables an optimal configuration of the vector pipeline for raw data processing, whereas another optimal configuration of the scalar pipeline may be chosen for optimal consumption/production of scalars for the vector processing. The configurability increases performance and can simplify programming of the processor. As such also the program code can be reduced.

As described in the dependent claim 5, at least one of the pipelines is configurable on an instruction-by-instruction basis. In this way, the performance can be increased even further and the code decreased further.

As described in the dependent claim 6, the scalar/vector processor is controlled using VLIW instructions with separate segments for each functional units. Preferably, the VLIW instruction includes separate instructions for the scalar section and the vector section of a functional unit. In this way, both parts can perform their tasks optimally.

As described in the dependent claim 8, the pipelines can also be configured via the VLIW instruction. This is an effective way of configuring the pipelines on an instruction-by-instruction basis.

As described in the dependent claim 9, the pipeline includes as many pipeline paths as there are functional units attached to the pipeline. Each of the functional units is associated with one of the paths. Such a path may, for example, be the path on which the functional units broadcasts the vector (or scalar for the scalar pipeline). As described in the dependent claim 10, the instruction for a functional unit indicates from which vector pipeline path the unit should consume a vector (and/or from which scalar pipeline path it should consume a scalar). Alternatively, the instruction for a functional unit could indicate on which vector pipeline path it should produce a vector output (and/or on which scalar pipeline path it should produce a scalar), where the functional unit associated with that path in one of the subsequent cycles consumes that produced data depending on the instruction given to that unit. In this way, full pipeline configurability can be achieved, while keeping the network addressing at a reasonable level of indicating only one path per pipeline. It will be appreciated that due to the fixed relationship between a path and a functional unit, indicating a path is the same as indicating a functional unit.

As described in the dependent claim 11, a shift unit is an example of a functional unit that optimally benefits from the co-operation between the scalar section and vector section of the functional unit.

To meet the object of the invention, a processing system includes a scalar processor and a scalar/vector processor as claimed in claim 1, wherein the scalar/vector processor is arranged as a co-processor to the scalar processor and the scalar processor is arranged to control the scalar/vector processor; the scalar section of the scalar/vector processor being arranged for performing in-loop scalar processing and the scalar processor being arranged for performing irregular, out-of-loop scalar processing. By relieving the scalar/vector processor from having to deal with irregular scalar operations, Amdahl's law can be overcome for a significant part. The scalar/vector processor according to the invention is optimally suited for dealing with in-loop scalar operations where the close co-operation between the scalar and vector sections ensures that the vector processing can continue as much as possible. The technology (such as CMOS technology, frequency of operation, etc) can be chosen optimally for both processors, giving a cost-effective system.

These and other aspects of the invention are apparent from and will be elucidated with reference to the embodiments described hereinafter.

DETAILED DESCRIPTION OF THE PREFERRED EMBODIMENT

Figure 1:
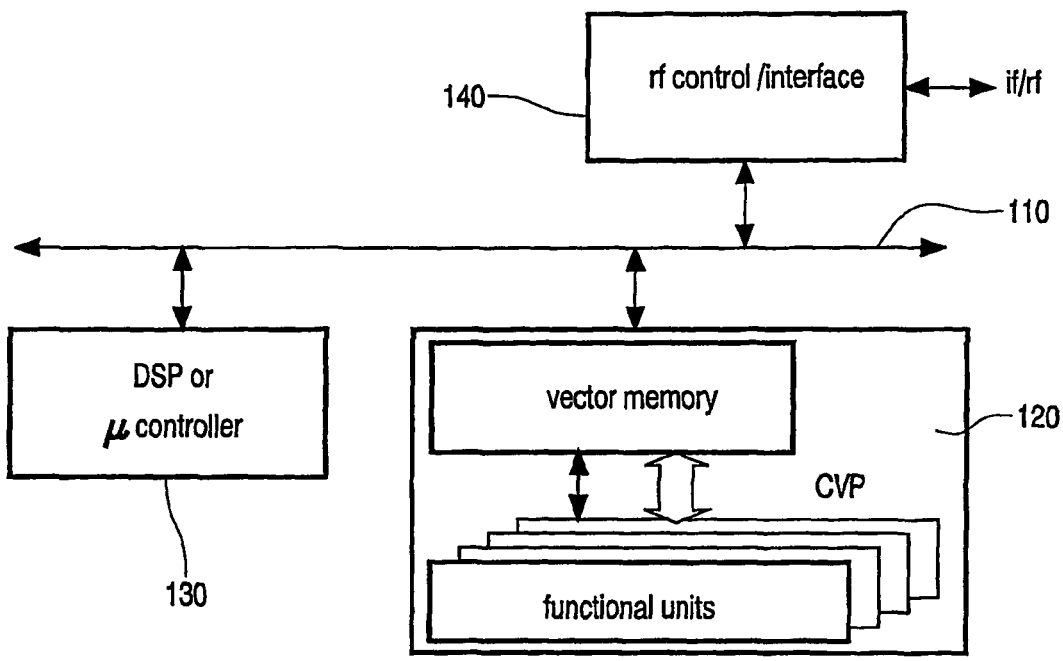
FIG. 1 shows a preferred configuration in which the scalar/vector processor according to the invention may be used.

FIG. 1 shows a preferred configuration in which the scalar/vector processor according to the invention may be used. In this configuration, three main components are connected via a bus 110. The bus 110 connecting these three components may be any suitable bus, for example an AMBA High-speed Bus (AHB). The main components are:
the programmable scalar/vector processor 120 according to the invention, comprising functional units and a local data memory (referred to as vector memory in FIG. 1),
a micro-controller or DSP subsystem 130, including limited on-chip program and data memory,
an interface block 140.

The scalar/vector processor 120 is mainly used for regular, "heavy/duty" processing, in particular the processing of inner-loops. The scalar/vector processor includes vector processing functionality. As such, it provides large-scale parallelism for the vectorizable part of the code to be executed. The vast majority of all signal processing will be executed by the vector section of the scalar/vector processor. With an array of, for example, 32 identical processing elements executing the same instruction, it offers massive parallelism. Combined with a 32-word wide memory interface this leads to unprecedented programmable performance levels at low cost and moderate power-consumption. However, fully exploiting this parallelism is not always feasible, as many algorithms do not exhibit sufficient data parallelism of the right form. According to Amdahl's law, after vectorization of the directly vectorizable part of the code, most time is spent on the remaining code. The remaining code can be split into four categories:
address related instructions (e.g. incrementing a pointer into a circular buffer, using modulo addressing)
regular scalar operations (i.e. scalar operation that correspond to the main loop of the vector processor)
looping
irregular scalar operations The fractions of code for each of these categories is highly dependant on the algorithm executed. For example, the Golay correlator (used for P-SCH searching) requires a lot of address related instructions, but this is not the case for other algorithms such as the Rake. However, one common property of all the algorithms the inventors have studied is that the fraction of irregular scalar operations is very limited. This property allows the separation of tasks between the scalar/vector processor (120) and the micro-controller or DSP (130).

The architecture according to the invention overcomes the first three problems by incorporating scalar processing functionality in the scalar/vector processor 120 closely integrated with the vector processing. The fourth problem can be overcome by using a separate micro-controller or DSP 130 that performs the irregular tasks and, preferably, controls the scalar/vector processor as well. In this preferred configuration, the scalar/vector processor 120 acts as a programmable, co-processor (in the remainder also referred to as CVP, Co-Vector Processor). The interface between the scalar/vector processor 120 and the micro-controller 130 deals with communication (e.g. through shared memory) and synchronization (e.g. through shared memory and status signals). The interface is preferably memory-mapped.

The interface block 140 allows the processors to interact with the remainder of the system. In the preferred embodiment, the scalar/vector processor is used as a software modem (transceiver) for 2G/3G mobile networks. For such a software modem function, controlling and interfacing the radio can not easily be performed by the scalar/vector processor (the control is irregular and the data are inherently communicated serially) or the micro-controller 130 (the interrupt rates would be too high). For such application it is preferred to use dedicated hardware as a front-end with as a main task to pass control and data words to the vector memory, for example DMA, under control of the micro-controller 130. The data in the vector memory is then processed by the scalar/vector processor. For a software modem, the receiver functions performed by the scalar/vector processor may include filters, a rake receiver, a channel estimator, a searcher, a de-interleaver, an up-link, a turbo decoder, a viterbi decoder, and a de-multiplexer. The transmitter functions performed by the scalar/vector processor may include a multiplexer, channel encoders, an interleaver, a transmitter, and filters. In itself, those functions are known and will not be described further.

The scalar/vector processor 120 may be a slave to the bus 110, whereas the micro-controller 130 and the interface block 140 (which may include a DMA unit) may act as a master. All the communication with the CVP, be it program, data, or control, is preferably memory mapped. The memory may be an off-chip DRAM, and that this DRAM that is also used as (de-) interleaving memory by the scalar/vector processor.

Figure 2:
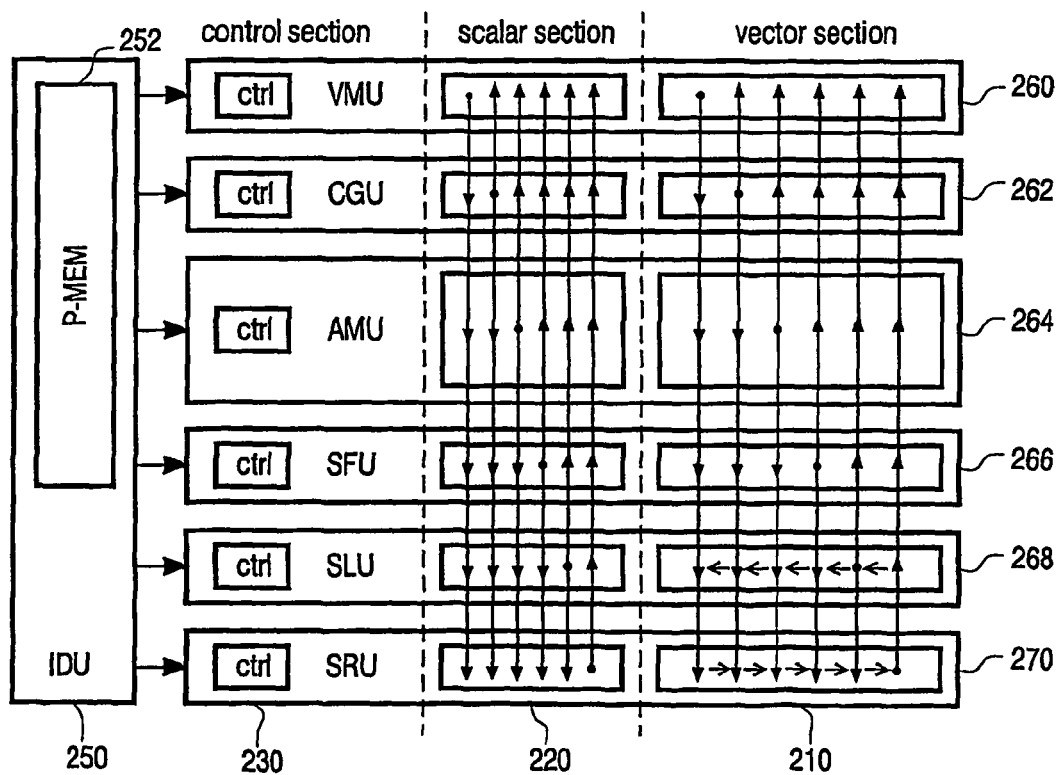
FIG. 2 shows the main structure of the scalar/vector processor according to the invention.

FIG. 2 shows the main structure of the processor according to the invention. The processor includes a pipelined vector processing section 210. In the preferred embodiment of FIG. 2, the vector section includes seven functional units that will be described in more detail below. Persons skilled in the art will be able to choose the optimal functional units for specific tasks. To support the operation of the vector section, the scalar/vector processor includes a scalar processing section 220 arranged to operate in parallel to the vector section. Preferably, the scalar processing section is also pipelined. To support the operation of the vector section, at least one functional unit of the vector section also provides the functionality of the corresponding part of the scalar section. For example, the vector section of a shift functional unit may functionally shift a vector, where a scalar component is supplied by (or delivered to) the scalar section of the shift functional unit. As such, the shift functional unit covers both the vector and the scalar section. Therefore, at least some functional units not only have a vector section but also a scalar section, where the vector section and scalar section can co-operate by exchanging scalar data. The vector section of a functional unit provides the raw processing power, where the corresponding scalar section (i.e. the scalar section of the same functional unit) supports the operation of the vector section by supplying and/or consuming scalar data. The vector data for the vector sections are supplied via a vector pipeline.

The functional units (FU) operate in parallel. Each FU is capable of receiving and sending vector data Many FUs are also capable of receiving and sending scalar data. One of the FUs is a special FU, called the Instruction Distribution Unit (IDU 250). It contains the program memory 252, and is responsible for sequencing the instructions, and distributing the instruction segments to itself and the other FUs. In principle, each FU has three sections: control 230, scalar 220, and vector 210. As will be described below in more detail, the control section and scalar section of some FUs may be empty.

The scalar/vector processor according to the invention applies instruction-level parallelism in two major ways:
1. vector processing, where a single instruction operates on vectors of (scalar) data. This approach is also known as single-instruction stream, multiple-data stream or SIMD.
2. parallel processing of multiple functional units, each operating on vectors. This can be seen as a (restricted) form of VLIW instruction-level parallelism, Note that these two forms of instruction-level parallelism are independent, and that their effects are cumulative.

Functional Units (FUs) Overview

In the preferred embodiment, the CVP includes the following seven specialized functional units.

Instruction Distribution Unit (IDU 250). The IDU contains the program memory 252, reads successive VLIW instructions and distributes the 7 segments of each instruction to the 7 functional units. Preferably, it contains a loop unit that supports up to three nested levels of zero-overhead looping. In the preferred embodiment, it does not support branches, jumps, or interrupts. The initial program counter is loaded from the stint descriptor, described in more detail below.

Vector Memory Unit (VMU 260). The VMU contains the vector memory (not shown in FIG. 2). During each instruction it can send a line or a vector from the vector memory or receive a line into the vector memory. The same instruction may specify in addition a scalar send operation and/or a receive operation. The VMU is the only functional unit connected to the external world, i.e. to the external bus 110.

The Code-Generation Unit (CGU 262). The CGU is specialized in finite-field arithmetic. For example, the CGU can be used for generating vectors of CDMA code chips as well as related functions, such as channel coding and CRC.

ALU-MAC Unit (AMU 264). The AMU is specialized in regular integer and fixed-point arithmetic. It supports inter-vector operations, where arithmetic is performed element-wise on multiple vectors. In a preferred embodiment, the AMU also provides some intra-vector operations, where arithmetic is performed on the elements within a single vector.

ShuFfle Unit (SFU 266). The SFU can rearrange elements of a vector according to a specified shuffle pattern.

Shift-Left Unit (SLU 268). The SLU can shift the elements of the vector by a unit, such as a word, a double word or a quad word to the left. The produced scalar is offered to its scalar section. Depending on the type of SLU vector-operation issued, the consumed scalar is either zero, or taken from its scalar section.

Shift-Right Unit (SRU 270). The SRU is similar to the SLU, but shifts to the right. In addition it has the capability to merge consecutive results from intra-vector operations on the AMU.

The following table shows that all FUs have a functional vector section, where some do not have a control section or scalar section.

| Functional Unit | control | scalar | vector |
|---|---|---|---|
| Instruction-Distribution Unit | sequencing, looping | | instruction distribution |
| Vector Memory Unit | address computation | scalar i/o | vector i/o |
| Code-Generation Unit | | | code vector generation |
| ALU-MAC Unit | indexing | broadcast segmentation | inter vector: ALU, MAC, mul, . . . intra vector: add, max |
| Shuffle Unit | | | vector shuffle |
| Shift-Left Unit | | scalar i/o | vector shift |
| Shift-Right Unit | | scalar i/o | vector shift |

It will be appreciated that for specific application other FUs may be chosen. Preferably, in a basic processor the AMU and the VMU are used, in combination with the IDU. If power consumption is critical, the SFU may be dropped since this unit consumes more power than the shift units that can assist in performing a shuffling operation. The SFU is particularly useful for Viterbi decoding. The CGU, and the specific form of the CGU, may be chosen depending on the requirements for calculation of codes that are difficult to produce using conventional AMU instructions, for example Galois field calculations and the generation of scrambling codes. In certain applications it may be beneficial to add one or more AMUs in order to obtain a higher average load of the FUs. Also other dedicated FUs may be added, for example, for performing certain bit-level calculations.

Preferably, at least one of the FUs is configurable in the sense that the operation of the FU can be influenced by a parameter stored in the FU. Preferably, such a parameter ("configuration data") can be read from the vector memory.

Such a configuration helps to simplify programming of the processor and reduce code-size.

Inter-FU Communication

All functional units operate in parallel. Upon reception of their segment of an instruction, they input, process, and output data, both vector data and, where applicable, scalar data. Among FUs the communication is strictly among the scalar sections or among vector sections (inter-FU communication). That is, the vector sections of all FUs except the IDU are connected by a pipeline. In a preferred embodiment, this pipeline is configurable on instruction basis. To this end, preferably the FUs are interconnected by an interconnect network, in principle allowing each vector section to receive a vector from any the of other vector sections during each cycle. This feature enables, amongst others, the creation of arbitrary pipelines of the FUs (except the IDU). The six of the functional units that contribute to the vector path can output a vector and send it to other units in parallel during each clock cycle. They can also receive a vector from another unit. The network is nearly fully connected. Only links that are not meaningful have been omitted. The connectivity in the vector path is tabulated below (! indicates a connection). Note that the AMU can receive two vectors simultaneously.

| FU target | source #inputs | vmu | cgu | amu | sfu | slu | sru |
|---|---|---|---|---|---|---|---|
| vmu | 1 | | ! | ! | ! | ! | ! |
| cgu | 1 | ! | | ! | ! | ! | ! |
| amu | 2 | ! | ! | | ! | ! | ! |
| sfu | 1 | ! | ! | ! | | ! | ! |
| slu | 1 | ! | ! | ! | ! | | ! |
| sru | 1 | ! | ! | ! | ! | ! | |

As shown in FIG. 2, the network is preferably formed by each FU being connected as a signal source (indicated by a disc) to one network path. It is connected to all other paths as a signal sink (indicated by a triangle). The section of the VLIW instruction for the FU indicates from which path it should consume a vector. In this way the pipeline can be configured on an instruction basis. Each path can transfer a full vector, e.g. using 256 parallel wires. Similarly, at least some of the scalar sections of the FUs are connected by a separate pipeline. Preferably, this pipeline is also configurable on instruction basis. The interconnect network among the scalar sections of the FUs can be partial in the sense that no scalar can be sent to or received from a scalar section of at least one FU. Hence, fewer pipeline orderings can be specified. The scalar and vector pipelines can be configured independently. For example, by indicating in the relevant VLIW section both the scalar pipeline and the vector pipeline to be read by the functional unit. It will be appreciated that instead of a FU having a fixed associated path for outputting data, alternatively it could have a fixed associated path for receiving data, where the VLIW instruction indicates the path on which data should be output.

| FU target | source #inputs | vmu | cgu | amu | sfu | slu | sru |
|---|---|---|---|---|---|---|---|
| vmu | 1 | | ! | | | ! | ! |
| cgu | 0 | | | | | | |
| amu | 1 | ! | | | | ! | ! |
| sfu | 0 | | | | | | |
| slu | 1 | ! | | | | | ! |
| sru | 1 | ! | | | | ! | |

As an example of the configurability, a first VLIW instruction may cause the AMU to consume a vector produced by the CGU and one produced by the VMU. The next instruction may cause the SFU to consume a vector from the VMU, and the AMU to consume a vector from the SFU. The third instruction may cause the AMU to consume a vector from the VMU and the SFU to consume a vector from the AMU.

There is no connectivity specified among the control sections of the different functional units. These control sections receive a segment of the VLIW instruction from the IDU, update their own state, and control their respective scalar and vector sections.

Intra-FU Communication

Within an FU there is tight interaction between these sections (intra-FU communication). The interaction is an integral part of the operation of the FU. Examples are the SLU and SRU, where the produced and/or consumed scalar is provided to/taken from the corresponding scalar section part of the FU. More details are given as part of the detailed description of the FUs.

Instructions are typically executed in a single cycle. Exceptions are caused by congestion at the vector memory and manifest themselves as stall cycles.

Data Widths and Data Types

Figure 3:
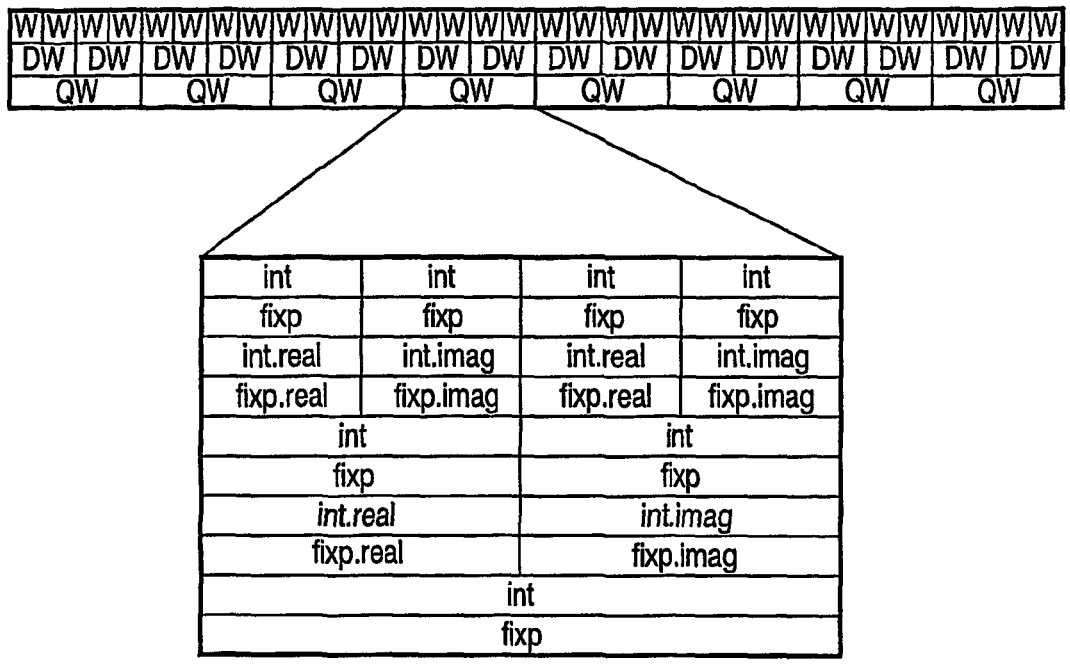
FIG. 3 shows supported data widths and data types.

In a preferred embodiment, the scalar/vector processor supports a plurality of data widths and data types as shown in FIG. 3. The basic unit of memory addressing is a word, also referred to as a single word. Preferably, data width can be a single word (W), double word (DW), or quad word (QW). The size of a word is W=8 bits. A double word (2W=16 bits) is a pair of words, and its address is always an even value. A quad word (4W=32 bits) is a pair of double words, and a quad-word address is always a multiple of four. Pairs of single words or double words can be used as complex numbers. A vector comprises $P_Q$ quad words, which corresponds to $2P_Q$ double words, and to $4P_Q$ single words. Preferably, $P_Q$=8, giving a total vector width is 256 bits for the preferred word size of 8 bits.

In a preferred embodiment, the CVP supports the following data types: integer, and complex integer:
1. integers (int) come in three sizes: words, double words, and quad words, i.e. the integer ranges $[-2^{N-1} \ldots 2^{N-1}]$, with N equal W, 2W, or 4W.
2. complex integer type, that is, a pair of integers (real, imaginary), indicated in FIG. 3 as int.real. Complex integers come in two size: double words and quad words.

A scalar is a value of any of the data types integer or complex integer. Hence, scalars come in three sizes: (single) words, double words, and quad words. A vector has a fixed size of $P_Q$ quad words. It can be structured in one of the three following formats:
1. $P_Q$ elements of size quad word,
2. $P_D=2P_Q$ elements of size double word,
3. $P_S=2P_D=4P_Q$ elements of size (single) word.

The vector-element indexing range is $[0 \ldots 4P_Q-1]$. Hence double words have even indices and the indices of quad words are multiples of four. FIG. 3 gives an overview of the relationship between the data size and data types. The architecture is fully scalable in $P_Q$ and is defined for any vector size $P_Q \geq 1$. However, for most situations it is preferred to choose a power of 2 for $P_Q$.

In the preferred embodiment, $P_Q$ is 8, implying a data path width and memory width of 32 words.

The involved mathematical operations can be configured or programmed to deal with the variations in data types. For example, four basic (low-precision) multipliers can be combined into a double-precision multiplier or into a complex multiplier. Such techniques are well-known in DSP and circuit design and are not described further.

Program Execution

The stint is the unit of CVP-program execution and synchronization. A stint is a finite, non-interruptible task described by a finite sequence of CVP instructions. A stint typically is a time-slice of a continuously active DSP kernel, requiring a few dozen of instructions for its description, and a few hundred cycles for its execution.

The CVP program memory may contain many stint programs. It is up to the micro-controller 130 to specify which stints to execute and in which order. For this purpose the micro-controller 130 can write a linked list of so-called stint-descriptors in the vector memory. Each stint descriptor refers to the corresponding object code, to a successor stint descriptor, and a description of possible signal(s) to generate upon the completion of the stint. A stint descriptor (SD) is a structure in the vector memory comprising 3 fields:
- the start address of the object code in program memory;
- the address of a successor stint (the next stint to be executed) in vector memory, nil if there is no successor;
- a signaling descriptor.

Instead of locating the stint descriptors in the vector memory, they may also be located in the CVP program memory.

In the preferred configuration, execution of a stint may be triggered in the following ways:
1. The CVP is in its idle state. The micro-controller 130 can now trigger the execution of a stint by writing the address of its SD on a designated VM address. This particular VM location will always contain the address of the currently active stint, and will contain a nil value when the CVP is idle.
2. Upon the completion of a stint, as indicated by an explicit EOS (end-of-stint) instruction in the CVP program, the CVP continues with the successor stint, assuming a successor is specified in the current SD. If such successor is not present, the CVP will return into its idle state.

The status of a stint (active/completed) can be polled by the micro-controller 130 by inspecting the designated "current-stint" location in the VM. Upon completion of a stint the CVP can optionally provide signaling to its environment. For a set of signal wires (output wires, at least one), it can be specified to pull it up, pull it down, or to toggle its state. These signals can for example be connected to interrupt inputs of the micro-controller 130 and the interface block 140.

Instructions

A CVP instruction is either a control instruction or a VLIW instruction. Control instructions are zero-overhead loop initialization, or stint termination. There are no branches, jumps, or subroutines. A VLIW instruction is partitioned into segments, where each instruction segment specifies the operation(s) to be performed by the corresponding functional unit. The segment can be further subdivided in a part for the vector section, and the scalar section (if present). The segment also includes for both parts information on which network part to use for receiving data (one or more vectors for the vector section and one or more scalars for the scalar section).

State of the Scalar/Vector Processor

The state of the CVP is the combined states of its functional units. In the preferred embodiment, it comprises:
- the vector memory (part of the VMU);
- the program memory (part of the IDU);
- vector registers (all functional units);
- scalar registers (most functional units);
- control registers, including the program counter, and address-offset registers.

In addition to the programmer-visible registers, a CVP realization typically contains additional registers (vector, scalar, and control) for pipelining and caching. These are not part of the CVP instruction-set architecture.

Some of the (vector, scalar, and control) registers are so-called configuration registers. The content of a configuration register can only be loaded from the vector memory; there is no other way to change its value. A configuration register supports the configuration of functional units, and typically defines a function parameter. By storing these "semi-constant" function parameters in configuration registers, both the instruction width and memory traffic are reduced considerably.

An overview of the components of the CVP state is presented in the table below.

| | control path | | | scalar path | | | vector path | | |
|---|---|---|---|---|---|---|---|---|---|
| FU | data | | configuration | data | | configuration | data | | configuration |
| vmu | offset | 5 | address cu 8 | | | | data memory | 2048 | |
| cgu | | | | counter | 3 | codes 3 | state | 6 | masks 2 |
| | | | | | | | | | polynomials 2 |
| amu | | | 1 | receive | 1 | segment size 1 | register file | 16 | |
| sfu | | | | | | | register | 1 | shuffle patterns 4 |
| slu | | | | receive | 1 | | register file | 2 | |
| sru | | | | receive | 1 | | register file | 2 | |
| idu | PC | 1 | loop cu 2 | | | | program mem. | 2048 | |

All programmer-visible registers can be loaded from the vector memory. All registers, except the configuration registers can be saved into the vector memory. By saving the CVP registers at the end of a stint, and by restoring them at a later time, the CVP can continue a particular task as if no other stints were executed meanwhile. These save and restore operations are optional, may be partial, and must be programmed explicitly.

Instruction-Level Execution

The program of a stint is stored in the program memory inside the IDU. The IDU controls the program counter, reads the current instruction and distributes 6 segments of the instruction to the corresponding 6 functional units. Typically one instruction can be issued each clock cycle. The only exception to the rule is caused by stall cycles of the VMU, when multiple vector memory accesses can not be realized in one cycle. Memory congestion and associated stall cycles may occur when there are multiple cache misses in a single cycle.

As there is no data-dependent control, the traffic from IDU to other functional units is one-way. This simplifies the pipelined execution of CVP instructions significantly. This pipelining is hidden from the programmer as much as possible. For example, the source register of one instruction can be the target register of a previous instruction. The only visible pipeline effects are associated with "expensive" resources, such as multiplication in the vector path. A number of operations have a latency of multiple clock cycles. Moreover, few of those also have an initiation interval of multiple clock cycles. (When an operation has an initiation interval of n cycles, two operations of that sort must be separated in time by n−1 cycles).

Detailed Description of the Preferred Functional Units

Each functional unit of the CVP can be partitioned into a control, scalar and vector section. These sections will be modeled according to a Moore machine model, comprising five elements: inputs, outputs, state, next-state function, and output function.

The state of the Moore machine is determined by the available memory and/or register(s). For each functional unit, a table is given that defines all allowed transitions, including the corresponding guards. A guard is the condition that needs to be true for the transition to occur. The transitions define the next-state functions and the output functions of the Moore machine. In order to be able to abstract from actual data types in the transition tables, the following conventions are used:

- P denotes the number of processing elements. Depending on the data size, P evaluates to: $P_S$ (WORD data elements), $P_D$ (DWORD data elements) or $P_Q$ (QWORD data elements);
- Unless specified otherwise, the C-style syntax is used;
- Square brackets are used to select an element within a vector. For example: v[p] denotes element p of vector v;
- The real and imaginary parts of a complex value x are denoted by Re(x) and Im(x), respectively;
- The brackets <and> are used to denote a complex pair. For example <re, im> denotes the complex number re+j·im;
- The operator ∀ ("for all") is used to denote that an operation has to be performed on a range of vector elements. The operator does not imply any order (i.e. all elements in the range can be processed in parallel). For example: $\forall_{p:0 \leq p < P} \{v[p]=0\}$ means that all elements of vector v will be set to 0. Note that the dummy variable used to denote the range (p in the example) has no functional meaning;
- The operator ∧ ("and") is used to separate operations that can be performed in parallel. In other words: unlike the C-separator ";" the ∧ operator does not imply that the operations have to be executed sequentially.
- The "if-then-else" operator known from C: "cond ? exp1 : exp2" evaluates to exp1 if cond is true, and exp2 otherwise.

Instruction-Distribution Unit

Figure 4:
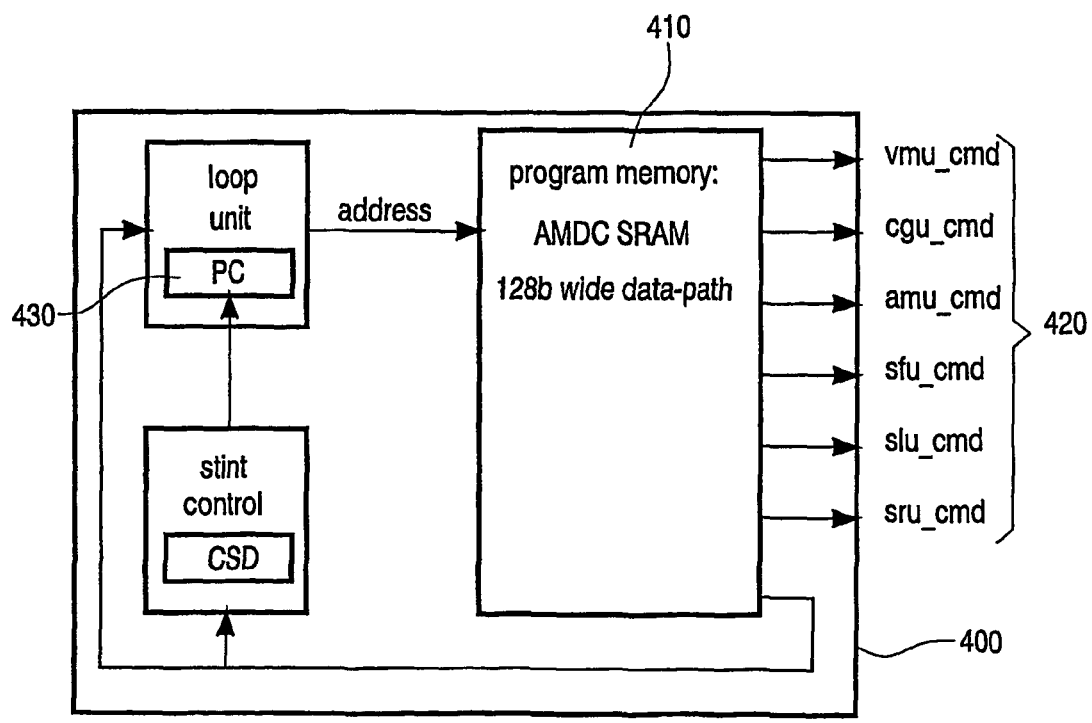
FIG. 4 shows a block diagram of the instruction-distribution unit.

FIG. 4 shows a block diagram of the instruction-distribution unit (IDU 400). The IDU has the following functions:
- it contains the program memory 410;
- it distributes operations 420 to the other functional units;
- it interprets stint descriptors, and controls the execution of kernels issued by the micro-controller 130.

For the latter it maintains the program counter 430 and supports zero-overhead looping, including three nesting levels.

The instruction distribution unit (IDU) can issue one of five instruction types:
1. normal VLIW instructions (NORMAL);
2. zero-overhead-loop initialization instructions (LOOP);
3. end-of-stint instructions (EOS);
4. subroutine call instructions (CALL);
5. subroutine return instructions (RETURN).

instruction=(NORMAL, commands)|(IDU_cmd, paddr, count)
commands=(VMU_cmd, CGU_cmd, AMU_cmd, SFU_cmd, SLU_cmd, SRU_cmd)
IDU_cmd=LOOP|EOS|CALL|RETURN
paddr={0, . . . , 65535}
count={1, . . . , 65536}

The inputs/outputs are:

| Output | Explanation |
|---|---|
| cmd_vmu | VMU command |
| cmd_cgu | CGU command |
| cmd_amu | AMU command |
| cmd_sfu | SFU command |
| cmd_slu | SLU command |
| cmd_sru | SRU command |

The IDU vector section contains the CVP program memory 410:

| Name | Explanation |
|---|---|
| pmem[2048] | Program memory: 2048 instructions of (approximately) 128 bits each |

Each cycle (unless the CVP is stalled by the VMU), a CVP instruction is fetched from the program memory location pointed to by the program counter (PC 430). This instruction can be one of five types:
1. a normal VLIW instruction: the commands encoded in the commands field of the instruction are distributed to the other functional units;
2. an IDU loop initialization instruction (LOOP): the loop control registers are set according to the PADDR and COUNT fields of the instruction. The loop body (consisting of the instructions following the LOOP instruction, up to and including the instruction specified by the PADDR field) should contain at least one instruction. Note that a loop body of 1 instruction is automatically recognized as a "special case", and treated similar to a repeat instruction on the R.E.A.L. DSP. Nested loops are allowed to have the same end addresses. The behavior for end addresses that are outside the range of the physically implemented program memory is undefined; the additional address bits are reserved for future extensions of the program memory. The loop start address is automatically set to the address of the first instruction following the LOOP instruction. No-operation commands are distributed to all other functional units;
3. an IDU end of stint instruction (EOS): if indicated in the current stint descriptor, one or more signals will be generated to indicate the completion of the stint. Then, the next stint pointer is evaluated. If it is NILL, the CVP will enter idle mode, otherwise the next stint descriptor will be loaded, and after initialization of the program counter (PC) execution of the corresponding stint will start.

4. an IDU subroutine call instruction (CALL), which supports a minimal form of subroutine calling. The subroutine calling mechanism supports three levels of nesting, and only saves the return address. Saving of register contents that may not be destroyed is the responsibility of the programmer, who can choose what calling convention to use (caller saved or callee saved). The PADDR field contains the address of the first instruction of the subroutine that is to be called, and thus it can be loaded directly into the program counter. The return address saved onto the return address stack is the address of the instruction following the CALL instruction.

5. an IDU subroutine return instruction (RETURN), which returns the program counter to the instruction following the corresponding CALL instruction (see above).

The IDU control section contains the CVP program counter (PC). It also contains registers to enable zero-overhead looping and subroutine calling, both supporting three levels of nesting:

| Name | # bits | Explanation |
|---|---|---|
| pc | 11 | The CVP program counter |
| count0 | 16 | Loop count registers (nested 3 levels) |
| count1 | | |
| count2 | | |
| end_addr0 | 11 | Loop end addresses (nested 3 levels) |
| end_addr1 | | |
| end_addr2 | | |
| ret_addr0 | 11 | Subroutine return addresses (nested 3 levels) |
| ret_addr1 | | |
| ret_addr2 | | |

Vector-Memory Unit

Figure 5A:
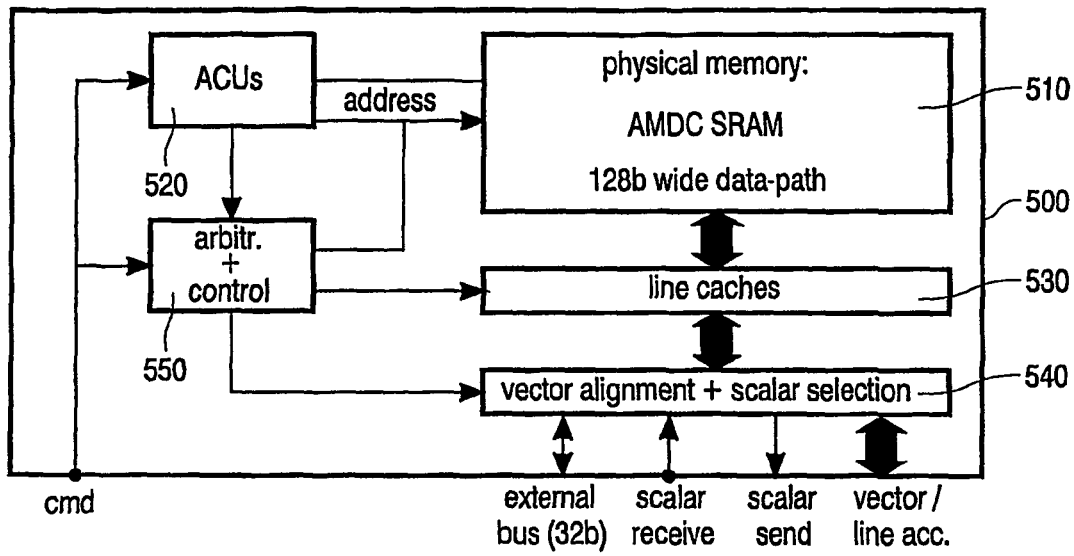
FIG. 5A shows a block diagram of the vector-memory unit.

FIG. 5A shows a block diagram of the vector-memory unit (VMU 500). The VMU contains and controls the vector memory 510, which provides a huge data bandwidth to the other functional units. The physical vector memory 510 is preferably based on a single-ported SRAM. Since embedded SRAMs that are Ps*W wide are not generally available, the physical memory may be formed by one or more banks of wide Random Access Memories (RAM) arranged in parallel. In the preferred embodiment, a vector needs not to be aligned at vector boundaries in the memory. As such, a vector consisting of $P_S$ words may have an arbitrary memory address. A memory line has the same size, but its start address is by definition a multiple of $P_S$. (For line accesses, the least significant $^2\log P_S$ bits of the address are ignored.) By allowing arbitrary alignment of vectors (typically alignment on the smallest word boundary), the memory can be utilized better, with less empty locations. As will be described in more detail below, measures are taken for allowing the scalar/vector processor to read/write individual vectors whereas the vector may be stored in two consecutive lines of the physical memory. Preferably, the scalar data is stored in the same memory as used for storing the vector data. In such a system, scalars can be intermixed with vectors to which they correspond. For cost-effectiveness and optimum access time to the memory, the memory preferably only allows reading and writing of full vector lines. As such, logically the physical memory consists of lines, each of the size of a vector. To support reading and writing of scalars additional hardware (line caches 530 and support 540 for scalar selection within a line) is used to access the vector-wide physical memory in a scalar fashion. Assuming that Nr scalar read ports and Nw scalar write ports are made available, a set of at least Nr+Nw vector wide registers are present in the cache 530. For each scalar read port, the corresponding register in the cache is connected to the read port of the (vector-wide) physical memory 510. The supporting hardware 540 includes a de-multiplexer to select the relevant scalar data from the register. The de-multiplexer may be controlled by the number of the scalar in the register as specified by the least-significant bits of the address (e.g. using a 256 bits vector with 32 8-bit words, the scalar is indicated by the five least significant bits). De-multiplexers are known and not described further. For each scalar write port, the corresponding register in the cache 530 is connected to a vector-wide multiplexer of Nw inputs to select which cache line is written back to the physical memory. When one VMU instruction requires multiple cache lines to be written back, this is done sequentially, stalling all other functional units until all writes have been completed. Accesses to different write ports, but in the same instruction, are not allowed to access the same line in the physical memory. Assuming spatial locality in successive scalar accesses (e.g. successive scalars belonging to one processing loop are stored substantially successively in the physical memory 510), the access frequency to the physical memory 510 to load/store these registers can be significantly below the scalar access frequency to these registers. Preferably, caching around the vector memory is hidden from the programmer. Despite the use of caches to emulate a multi-port vector memory with a single-port SRAM, the programmer can then assume a coherent vector memory. Since each register can contain a copy of possibly the same data in the physical memory, coherency should then be maintained automatically instead of the programmer having to guard coherency. To this end, a check is performed for address conflicts, i.e. has a write to a register occurred for a line address, where the same line is also stored in one of the other registers. For such a check it is sufficient to store for each register, the line address (most significant part of the address) of the line stored in the register. If a possible conflict is detected, a correction measure can be taken. For example, a read register is marked as invalid as soon as a write operation has occurred to a register with the same line. No further use can be made of the register unless it has been read again from the memory (after the write register has first been written back to the memory). Alternatively, the content of a write register may be copied to all read registers with the same line after a write has occurred to the write register. A third possibility is to share registers among read and write ports. This latter approach requires additional vector-wide multiplexers, increasing costs, but offers a performance advantage. The same coherency checks and measures can also be taken for vector reads where the vector is (partially) stored in a register pertaining to a write port. Preferably, a line read or write to the physical memory is performed in a single clock cycle by means of a single access to the physical memory 510.

Since the physical memory can only be accessed on line boundaries, an alignment unit is required for vector send operations. The alignment unit consists of two line caches, containing both lines spanned by the requested vector. When consecutive vectors are accessed, only one new line has to be fetched from the physical memory, since the other one is still present in one of these line caches. The parts of the two cached lines that form the requested vector are combined with a network consisting of multiplexers, and then stored in a vector-wide pipeline register. From this pipeline register, the value is transmitted on the VMU broadcast bus.

The vector-memory unit can support up to four concurrent "sub-operations" in a single VMU instruction:
1. send a vector, or send a line, or receive a line from/to VM location;
2. send a scalar from a VM location;
3. receive a scalar to a VM location;
4. modify the state/output of an address computation unit.
  VMU_cmd=(vopc, aid_v, ainc_v, sopc, aid_s, ainc_s, size, srcv, aid_r, ainc_r, aopc, aid_a, imm_addr)
    vopc=NOP|SENDL|SENDV|RCVL_CGU|RCVL_AMU|RCVL_SFU|RCVL_SLU|RCVL_SRU
    Aid_v={0, . . . , 7}
    Ainc_v=NOP|INC
    sopc=NOP|SEND
    aid_s={0, . . . , 7}
    ainc_s=NOP|INC
    size=WORD|DWORD|QWORD
    srcv=NONE|VMU|AMU|SLU|SRU
    aid_r={0, . . . , 7}
    ainc_r=NOP|INC
    aopc=NOP|IMM|LDBASE|LDOFFS|LDINCR|LDBOUND
    aid_a={0, . . . , 7}
    imm_addr={0.0, . . . , 524288.31}|{−262144.0, . . . , 262143.31}

The VMU instruction may take a variable number of clock cycles, depending on the number of sub-operations and the continuity of address sequences.
The VMU inputs/outputs are:

|  | Explanation |
| --- | --- |
| Input |  |
| Cmd | VMU command |
| rcv_amu | AMU vector receive bus |
| rcv_cgu | CGU vector receive bus |
| rcv_sfu | SFU vector receive bus |
| rcv_slu | SLU vector receive bus |
| rcv_sru | SRU vector receive bus |
| s_rcv_amu | AMU scalar receive bus |
| s_rcv_slu | SLU scalar receive bus |
| s_rcv_sru | SRU scalar receive bus |
| Output |  |
| Snd | VMU vector result |
| s_snd | VMU scalar result |

In addition there are two scalar ports (one send, one receive) to be connected to the external bus. Synchronization of these memory accesses with CVP instructions is the task of the micro-controller 130.

The VMU vector section contains the physical vector memory 510:

| Name | Explanation |
| --- | --- |
| mem[4096][32] | Vector memory: 4096 lines of 32 words each |

Note that vector sub-operations cannot access the scalar memory. Hence, the most significant address bit is ignored for vector suboperations. The vector section of the VMU supports seven sub-operations, encoded in the VOPC field of the instruction: vector send (SENDV), line send (SENDL), and five line receive sub-operations (RCVL_CGU, RCVL_AMU, RCVL_SFU, RCVL_SLU, and RCVL_SRU). The functional unit that is the source of the receive is explicitly encoded in the corresponding line receive sub-operation. The read address or write address for each sub-operation is specified by a corresponding address computation unit. The AINC_V field is shared between all vector sub-operations. It will be passed on to the ACU encoded in the AID_V field. The AINC_V field specifies whether the affected address computation unit should perform a post-increment operation.

| Guard | Transition |
| --- | --- |
| vopc = NOP | None |
| vopc = SENDL | snd = mem.line[acu[aid_v].out] |
| vopc = SENDV | snd = mem.vector[acu[aid_v].out] |
| vopc = RCVL_CGU | mem.line[acu[aid_v].out] = rcv_cgu |
| vopc = RCVL_AMU | mem.line[acu[aid_v].out] = rcv_amu |
| vopc = RCVL_SFU | mem.line[acu[aid_v].out] = rcv_sfu |
| vopc = RCVL_SLU | mem.line[acu[aid_v].out] = rcv_slu |
| vopc = RCVL_SRU | mem.line[acu[aid_v].out] = rcv_sru |

Note that the operations are cast as send (or receive) actions, and not as load (or store) actions involving a destination (or source). The latter are specified by operations in other functional units. A line send is functionally equivalent to a vector send with the same address. Line-send sub-operations are typically used to configure functional units, or to restore the state of a task in the various registers. By introducing a special mode for line send, the access times of successive vector sends ("vector streaming") can be optimized through efficient usage of caches.

The scalar sub-operation of the VMU is encoded in the SOPC field of the instruction. It supports only one sub-operation: scalar send (SEND). The read address is specified by the address computation unit specified in the AID_S field. The AINC_S field of the instruction specifies whether this address computation unit should perform a post-increment operation. The operand size (WORD, DWORD or QWORD) of the scalar sub-operation is determined by the SIZE field of the instruction.

| Guard | Transition |
| --- | --- |
| sopc = NOP | None |
| sopc = SEND && size = WORD | S_snd = mem.word[acu[aid_s].out] |
| sopc = SEND && size = DWORD | S_snd = mem.dword[acu[aid_s].out] |
| sopc = SEND && size = QWORD | S_snd = mem.qword[acu[aid_s].out] |

The scalar receive sub-operation of the VMU is encoded in the SRCV field of the instruction. If its value is NONE, no scalar receive is performed. Otherwise, the SRCV field of the instruction determines which functional unit will be used as source for the scalar receive. The write address is specified by the address computation unit specified in the AID_R field. The AINC_R field of the instruction specifies whether this computation unit should perform a post-increment operation. The operand size (WORD, DWORD or QWORD) of the scalar receive sub-operation is determined by the size of the source scalar.

| Guard | Transition |
| --- | --- |
| srcv = NONE | None |
| srcv = VMU | mem.scalar[acu[aid_r].out] = s_rcv_vmu |
| srcv = AMU | mem.scalar[acu[aid_r].out] = s_rcv_amu |
| srcv = SLU | mem.scalar[acu[aid_r].out] = s_rcv_slu |
| srcv = SRU | mem.scalar[acu[aid_r].out] = s_rcv_sru |

The send and receive sub-operation can be combined into a scalar move operation, from one VM location to another. The address for each access is specified by a corresponding address computation unit.

The VMU control section 550 is mainly a set of address-computation units (ACU) or address generation units (AGU) that support addressing modes like those in conventional DSPs. Such a unit performs one or more address calculations per instruction without using the processor's main data path. For example, the address of a scalar can be post-incremented after each scalar read access. This allows address calculation to take place in parallel with arithmetic operations on data, improving the performance of the processor. Depending on the set of addressing modes supported, such an ACU needs access to a number of registers. For example,
Relative addressing, i.e. addressing relative to a so-called base address, requires a base register base
- The offset with respect to the base address is stored in an offset register offs
- Pre/post increment the offset by a value stored in an increment register incr
- Modulo addressing with respect to an address stored in a bound register bound With this set of addressing modes, the following can be supported. Assume an offset register offs. After each memory access (read or write) at address base+offs, register offs is updated according to offs:=(offs+incr) modulo bound. Hence, offs changes frequently (after every access), whereas the values stored in base, incr, and bound change infrequently. Typically those three latter registers are initialized prior to a program loop. In the remainder, it is assumed that the registers are part of the ACU. The initialization of the register is described as "configuration of the ACU". Preferably, the scalar/vector processor includes a plurality of ACUs. In the preferred embodiment, the scalar/vector processor includes eight ACUs. Configuration of an individual ACU may take a few clock cycles per ACU. As such, the time required for configuration of ACUs can become a bottle-neck as more and more hurdles of Amdahl's law are taken. To overcome such a configuration delay, in a preferred embodiment at least two registers pertaining to one ACU can be configured in a single operation. This can be realized by mapping all those ACU registers on a single vector and by using dedicated load and store instructions from the vector memory to the ACU memory. Preferably, the entire set of relevant registers of an ACU can be configured in a single operation of preferably one clock cycle. If the memory width allows, advantageously registers of more than one ACU can be configured in one operation as will be described in more detail below.

Assuming that the vector memory comprises $2^L$ lines, a scalar or vector address requires $L+{}^2\log 4P_Q$ bits. With, for example $P_Q=8$ and $L=12$, this means 17 bits. In order to avoid excessively long instructions and to avoid separate instructions on address calculations as much as possible, the control section of the VMU maintains a number of address computation units as described above. Each address computation unit (ACU) consists of a number of address registers, and an associated increment operation. These ACUs 520 are intended to support, amongst others, circular buffers. Preferably, the VMU control section contains 8 ACUs, each of which can be assigned flexibly to any of the VMU sub-operations. A restriction is that each ACU may only be used for one of the VMU sub-operations, with the exception of the ACU sub-operation, i.e. AID_V≠AID_S≠AID_R.

The VMU control section supports one sub-operation, encoded in the AOPC field of the VMU instruction. It supports one sub-operation to set the output of an ACU to an immediate address value (IMM), and four sub-operations to load an immediate address into one of the ACU-registers (LDBASE, LDOFFS, LDINCR, and LDBOUND). The corresponding immediate address is encoded in the IMM_ADDR field. The AID_A field specifies which ACU is to be affected by the AOPC sub-operation; the AOPC field and IMM_ADDR field from the VMU instruction will be passed on directly to this particular ACU, and the AOPC field of all other ACUs will be set to no operation (NOP).

Preferably, each ACU contains four address registers:

| Name  | # bits      | Explanation                              |
|-------|-------------|------------------------------------------|
| base  | 24 unsigned | Address base register.                   |
| offs  | 24 unsigned | Address offset from base.                |
| incr  | 24 signed   | Increment value (−bound < incr < bound). |
| bound | 24 unsigned | Upper bound.                             |

Figure 5B:
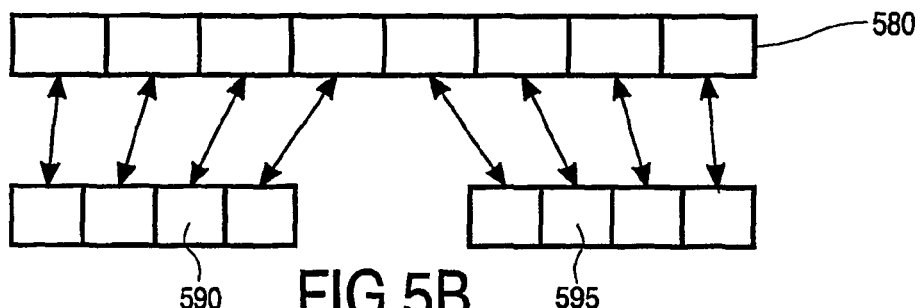
FIG. 5B illustrates mapping sets of ACU registers one vector register.

The preferred address range and type (signed/unsigned) is also indicated in the table. In this configuration, the four ACU registers require 4*24=96 bits. As described earlier, preferably a vector is 256 bits wide. In such a case, it is preferred to increase the ACU configuration speed even further by mapping the registers of multiple ACUs to one vector. In the example, two sets of ACU registers can be mapped to one register. This is also illustrated in FIG. 5B. A vector is indicated by number 580 and the quad word boundaries are shown. Two sets of ACU registers 590 and 595 are also shown, each corresponding to different ACUs. In the example, the ACU registers are 24 bits and as such do not correspond to one of the standard data sizes of the vector. To be able to also easily access the individual ACU registers through the vector memory, the special instructions for loading/storing the ACU registers to the memory ensure that the individual ACU registers are aligned on word boundaries (in the example, the 24 bits register are aligned on quad-word boundaries). Persons skilled in the art will be able to define optimal mapping depending on the ACU register size and the vector size. For example, using 16 bit ACU registers and a 256 bit vector makes it possible to map four sets of ACU registers to one vector. In the instructions the numbers of the ACUs to be stored/loaded need to be indicated. Separate or combined instructions may be used for loading the register set of a single ACU or of a group of ACUs.

An address computation unit (ACU) can support two "sub-operations" during a single ACU operation:
1. A post-increment sub-operation;
2. An immediate address manipulation sub-operation.
   ACU_cmd=(ainc, aopc, imm_addr)
   ainc=NOP|INC
   aopc=NOP|IMM|LDBASE|LDOFFS|LDINCR|LDBOUND
   imm_addr={0.0, . . . , 524288.31}|{−262144.0, . . . , 262143.31}

The post-increment sub-operation is encoded in the AINC field of the instruction. It supports only one sub-operation: post-increment (INC). This sub-operation is used to avoid excessive explicit address calculation instructions.

| Guard      | Transition                  |
|------------|-----------------------------|
| ainc = NOP | None                        |
| ainc = INC | offs = (offs + incr) mod bound |

The immediate address manipulation sub-operation is encoded in the AOPC field of the instruction. It supports one sub-operation to output an immediate address (IMM), and four sub-operations to load an immediate address into one of the ACU-registers (LDBASE, LDOFFS, LDINCR, and LDBOUND). The immediate address is encoded in the IMM_ADDR field of the instruction.

| Guard | Transition |
|---|---|
| aopc = NOP | out = base + offs |
| aopc = IMM | out = imm_addr |
| aopc = LDBASE | out = base + offs; base = imm_addr |
| aopc = LDOFFS | out = base + offs; offs = imm_addr |
| aopc = LDINCR | out = base + offs; incr = imm_addr |
| aopc = LDBOUND | out = base + offs; bound = imm_addr |

The ACU inputs/outputs are:

| | Explanation |
|---|---|
| Input | |
| cmd | ACU command (see instruction format for details) |
| Output | |
| out | ACU address (line address + scalar within line) |

Code-Generation Unit

Figure 6:
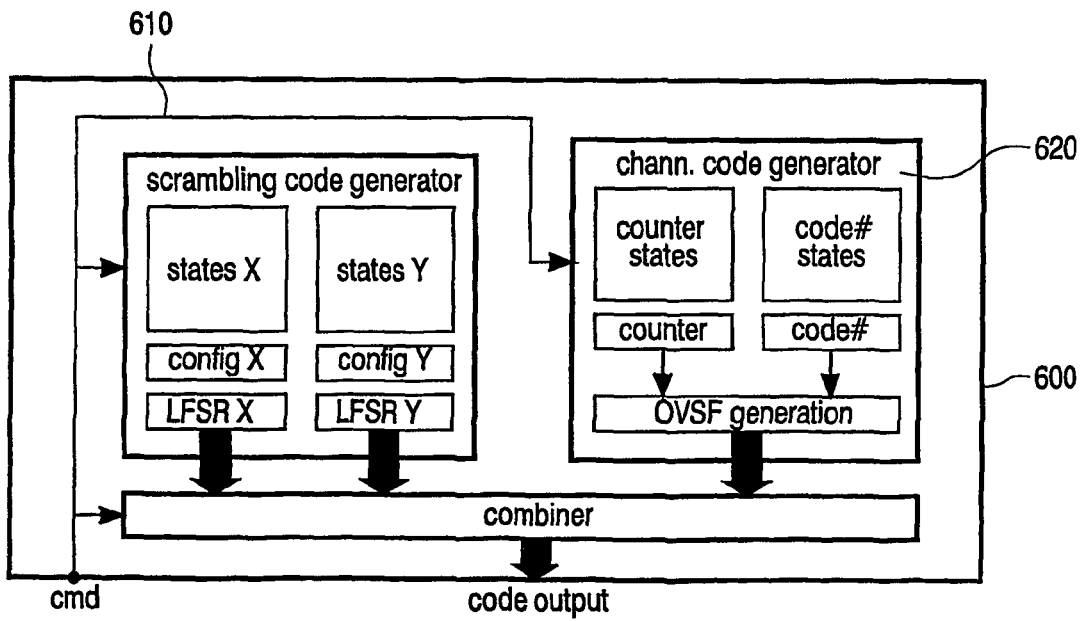
FIG. 6 shows a block diagram of the code-generation unit.

FIG. 6 shows a block diagram of the CGU (code-generation unit 600). The task of the CGU is to generate code sequences of complex symbols, formatted in vectors of $P_D$ or $P_S$ length. In a preferred embodiment, this code sequence is tailored to the needs for (W−)CDMA, and can be structured as the product of two sequences, a scrambling code and a channelization code. For such an application, the CGU consists of a scrambling code generator (SCG 610) and a channelization code generator (CCG 620). The scrambling code is generated by means of a configurable generator. The channelization code generator may also be replaced by a look up table. The table could be resident in the vector memory. The CGU may have only limited functionality, like only supporting UMTS-FDD downlink code generation. The code generation unit (CGU) supports two sub-operations:
1. a scrambling code generator sub-operation;
2. a channelization code generator sub-operation.
    CGU_cmd=(scram_opc, scram_reg, chan_opc, chan_reg, chan_config)
    scram_opc=OFF|NOP|LOAD_CONFIG|CONFIG|LOAD_STATE|SAVE_STATE|LOAD_REGS_X|LOAD_REGS_Y|SAVE_REGS_X|SAVE_REGS_Y|STEP_1|STEP_P_D|STEP_1_X|STEP_P_D_X
    scram_reg={cgus0, cgus1}
    chan_opc=OFF|NOP|CONFIG|LOAD_STATE|SAVE_STATE|STEP_1|STEP_P_D
    chan_reg={cguc0, cguc1}
    chan_config=0, . . . , $^2\log(SF_{MAX})-1$
The inputs/outputs are:

| | Explanation |
|---|---|
| Input | |
| Cmd | CGU command (see instruction format for details) |
| rcv_vmu | VMU vector receive bus |

| | Explanation |
|---|---|
| Output | |
| Snd | CGU vector result |

The CGU vector section contains the following register (file)s:

| Name | # bits | Explanation |
|---|---|---|
| poly_x | 18 | Polynomial for LFSR X |
| mask_x | 18 | Mask for LFSR X |
| cstate_x | 18 | Current state of LFSR X |
| state_x0, state_x1 | 18 | Additional states of LFSR X |
| poly_y | 18 | Polynomial for LFSR Y |
| mask_y | 18 | Mask for LFSR Y |
| cstate_y | 18 | Current state of LFSR Y |
| state_y0, state_y1 | 18 | Additional states of LFSR Y |
| Ccounter | 9 | Current counter register |
| counter0, counter1 | 9 | Additional counter registers |
| ccode_no | 9 | Current code number |
| code_no0, code_no1 | 9 | Additional code number registers |

Figure 7:
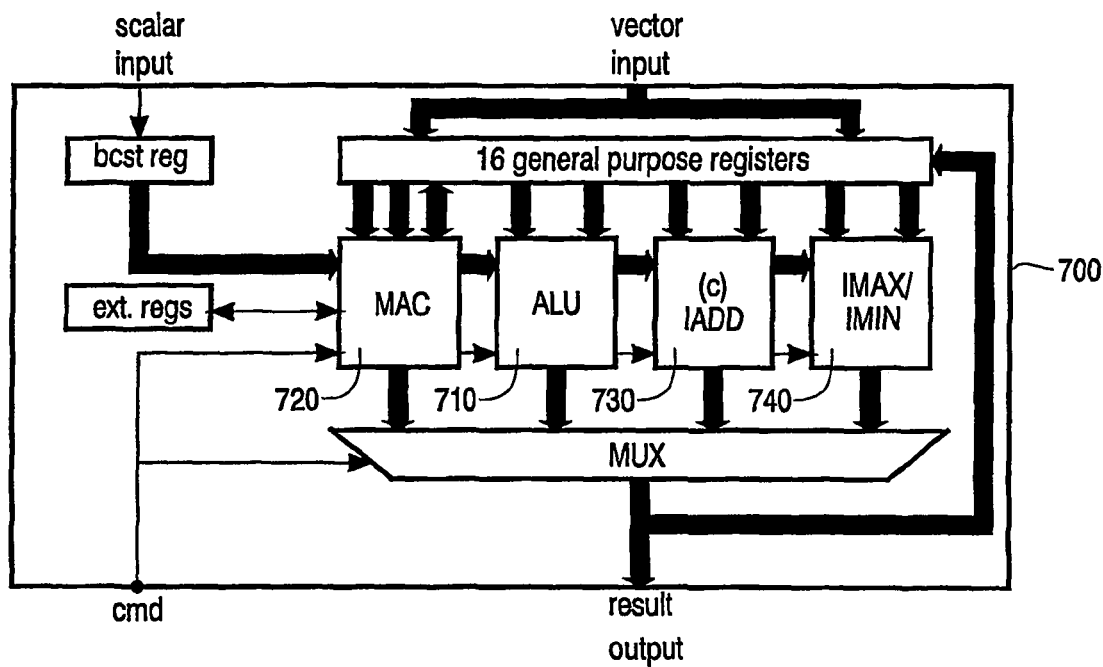
FIG. 7 shows a block diagram of the ALU-MAC unit.

The SCRAM_OPC field of the CGU instruction specifies one of the following SCG vector sub-operations:
    turn the scrambling code generator off (CGUS_OFF);
    no-operation (CGUS_NOP);
    load configuration vector from vmu (CGUS_LOAD_CONFIG);
    configure LFSR X and LFSR Y with the configuration vector (CGUS_CONFIG);
    load LFSR X and LFSR Y states from the internal register specified in the SCRAM_REG field (CGUS_LOAD_STATE);
    save LFSR X and LFSR Y states into the internal register specified in the SCRAM_REG field (CGUS_SAVE_STATE);
    load the entire LFSR X internal register file from VMU (CGUS_LOAD_REGS_X);
    load the entire LFSR Y internal register file from VMU (CGUS_LOAD_REGS_Y);
    save the entire LFSR X internal register file in VMU (CGUS_SAVE_REGS_X);
    save the entire LFSR Y internal register file in VMU (CGUS_SAVE_REGS_Y);
    advance LFSR X and LFSR Y by a single step (CGUS_STEP_1);
    advance LFSR X and LFSR Y by $P_D$ steps (CGUS_STEP_P_D);
    advance LFSR X by a single step (CGUS_STEP_1_X);
    advance LFSR X by $P_D$ steps (CGUS_STEP_P_D_X).
The CHAN_OPC field of the CGU instruction specifies one of the following CCG vector sub-operations:
    turn the channelization code generator off (CGUC_OFF);
    no-operation (CGUC_NOP);
    configure the channelization code generator with the code number specified in the CHAN_CONFIG field (CGUC_CONFIG);
    load an OVSF state from the internal register specified in the CHAN_REG field (CGUC_LOAD_STATE);
    save an OVSF state to the internal register specified in the CHAN_REG field (CGUC_SAVE_STATE);
    advance the OVSF counter by a single step (CGUC_STEP_1);
    advance the OVSF counter by $P_D$ steps (CGUC_STEP_P_D).
ALU-MAC Unit FIG. 7 shows a block diagram of the ALU-MAC unit (AMU). The AMU is the heart of the machine, in the sense that it harbors the actual signal operations, and that the other units are merely there to transfer the operands and results in a vector-formatted fashion. It also contains a relatively large vector register file (preferably, 16 vector registers). Accumulator vectors require two (normal) vector registers, plus a so-called extension-vector, which contains the extended precision bits. Thus, together with the extension register file, the AMU register file, preferably, also supports 8 accumulator vector registers. In a preferred embodiment, the AMU vector section contains five independent internal processing units:

- the ALU unit 710, which processes arithmetic and logic type of inter-vector operations: addition (ADD), subtraction (SUB), bitwise AND (AND), bitwise OR (OR), bitwise exclusive OR (XOR), and Hamming distance calculation (HAMM);
- the MAC unit 720, which processes multiply and multiply accumulate type of inter-vector operations: magnitude (MAGN), multiply (MUL), and multiply-accumulate (MAC);
- the (C)I-ADD unit 730, which processes (correlate) intra-add vector operations: intra-add (IADD), intra-add with double precision result (IADDD), and inter-vector correlate followed by intra-add (CIA);
- the I-MAX/MIN unit 740, which processes intra-vector maximum and minimum operations: intra-maximum (IMAX), and intra-minimum (IMIN); and
- a scaling unit, used to provide flexible fixed point support with integer arithmetic.

It will be appreciated that depending on the application some of these sub-units may not be required. Similarly, other sub-units may be added. For example, when support for outer transceiver algorithms is added, the AMU preferably contains two additional processing units:

- the acs unit, which processes the Viterbi add-compare-select operation (acs);
- the abl unit, which processes the αβΛ operation (ab1) required for turbo decoding. Which processing unit is to be used is not explicitly encoded in the AMU instruction, but derived implicitly from the vopc field. This means that initiation intervals do not hamper performance, as long as subsequent vector instructions are issued to different processing units.

The ALU-MAC unit (AMU) supports up to 4 "sub-operations" during a single AMU operation:

1. perform a vector operation of type ALU (arithmetic and logic), MAC (multiply-accumulate), (C)I-ADD ((correlate) intra-add), or I-MAX/MIN (intra-maximum or intra-minimum);
2. receive a vector value to the AMU vector register file;
3. receive a second vector value to the AMU vector register file;
4. receive a scalar value to the AMU broadcast register (BCST);

AMU_cmd=(vopc, type, src1, src2, src34x, rcv1, dst1, rcv2, dst2, srcv)
vopc=NOP|SND|ADD|SUB|ABS|NEG|MAX|
 MIN|CONJ|MAGN|IADD|DIADD|IMAX|
 IMIN|CIA|AND|OR|XOR|MUL|MAC|SGNX
type=cvp_int|cvp_dint|cvp_cint|cvp_qint|cvp_cdint
src1={amu0, . . . , amu15}
src2={amu0, . . . , amu15}|{bcst}
src34x=src3ϵ{amu0, . . . , amu15}accϵ{acc0, . . . , acc7}|lsegϵ{1, 2, 3, . . . , $^2\log P_S$}
rcv1=NONE|VMU|CGU|AMU|SFU|SLU|SRU
dst1={amu0, . . . , amu15}
rcv2=NONE|VMU|CGU|AMU|SFU|SLU|SRU
dst2={amu0, . . . , amu15};dst2≠dst1
srcv=NONE|VMU|SLU|SRU The inputs/outputs are:

| | Explanation |
|---|---|
| Input | |
| Cmd | AMU command (see instruction format for details) |
| rcv_vmu | VMU vector receive bus |
| rcv_cgu | CGU vector receive bus |
| rcv_sfu | SFU vector receive bus |
| rcv_slu | SLU vector receive bus |
| rcv_sru | SRU vector receive bus |
| s_rcv_vmu | VMU scalar receive bus (broadcast unit) |
| s_rcv_slu | SLU scalar receive bus (broadcast unit) |
| s_rcv_sru | SRU scalar receive bus (broadcast unit) |
| Output | |
| Snd | AMU vector result |
| s_snd | AMU scalar result |

The AMU vector section contains the following register files:

| Name | # bits | Explanation |
|---|---|---|
| amu0, . . . , amu15 | $P_S \times 8$ | General purpose register file ($RF_{AMU}$) |
| acc0, . . . , acc7 | $P_S \times 20$ | Accumulator register file. Accumulator registers are mapped onto two general purpose registers (from $RF_{AMU}$), plus an extension register (from $RF_{EXT}$) containing the extended precision bits |

Figure 8:
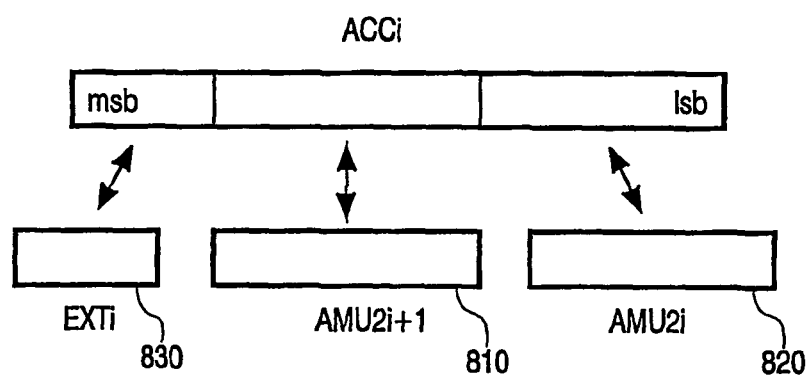
FIG. 8 illustrates the structure of an accumulator register.

Each accumulator register requires two AMU registers 810, 820, plus one extension register 830 as illustrated in FIG. 8. For example, register ACC3 occupies the registers AMU6, AMU7 and EXT3. Note that the extension register file is only used to store the extended precision part of accumulator values. Therefore, it can not be accessed by itself, and as such it is not visible to the programmer.

The vector sub-operation is encoded in the VOPC field of the AMU instruction. It supports four kinds of sub-operations:

1. arithmetic and logic type of inter-vector operations: send a register value (SND), addition (ADD), subtraction (SUB), absolute value (ABS), negation (NEG), maximum (MAX), minimum (MIN), bitwise AND (AND), bitwise OR (OR), bitwise exclusive OR (XOR), and sign extension (SGNX);
2. multiply and multiply accumulate type of inter-vector operations: magnitude (MAGN), multiply (MUL), and multiply-accumulate (MAC);
3. (correlate) intra-add vector operations: intra-add (IADD), intra-add with double precision result (DIADD), and inter-vector correlate followed by intra-add (CIA);
4. the intra-maximum (IMAX), and intra-minimum (IMIN) operations;

The data type to be used is encoded in the TYPE field of the AMU instruction. The SRC1 and SRC2 fields denote which registers should be used as source 1 and source 2 of the vector sub-operation, respectively. Note that the SRC2 data can alternatively come from the scalar broadcast register BCST, instead of from the regular register file $RF_{AMU}$. In this case, the same scalar value is sent to each processing element. Similarly, the SRC34X field denotes which register should be used as source 3 (denoted as SRC3) for sub-operations that require 3 vector sources. In case of multiply (-accumulate) sub-operations, the SRC34X field indicates which accumulator register (denoted as ACC) should be used (both as source and as destination). In case of intra-vector operations (IADD, DIADD, IMAX, IMIN, and CIA), the SRC34X field contains the base-2 logarithm (denoted as LSEG) of the segment size: $^2\log(\text{SEG})$. The minimum segment size is 2 (SRC34X=1). The upper limit depends on the data size: $P_S$ (LSEG=5) for WORD sized operands, $P_D$ (LSEG=4) for DWORD sized operands, and $P_Q$ (LSEG=3) for QWORD sized operands.

| Guard | Segment size (seg) |
|---|---|
| lseg = 0 | seg = segment (see section Error!Reference source not found.) |
| lseg ≠ 0 | seg = $2^{lseg}$ |

The result of an intra-vector operation is a sparse vector, in which only position 0 of each segment is calculated. The other positions of the target register are set to 0. In conjunction with the shift-right unit, the shuffle unit can be used to reorder the contents of such a sparse vector.

| Guard | Transition |
|---|---|
| vopc = NOP | None |
| vopc = SND | $\forall_{p:0 \leq p<P}$ { snd[p] = src1[p] } |
| vopc = ADD | $\forall_{p:0 \leq p<P}$ { snd[p] = src1[p] + src2[p] } |
| vopc = SUB | $\forall_{p:0 \leq p<P}$ { snd[p] = src1[p] − src2[p] } |
| vopc = CONJ | $\forall_{p:0 \leq p<P}$ { snd[p] = < Re(src1[p]), −Im(src1[p])> } |
| vopc = ABS | $\forall_{p:0 \leq p<P}$ { snd[p] = \| src1[p] \| } |
| vopc = NEG | $\forall_{p:0 \leq p<P}$ { snd[p] = −src1[p] } |
| vopc = MAX | $\forall_{p:0 \leq p<P}$ { snd[p] = max(src1[p], src2[p]) } |
| vopc = MIN | $\forall_{p:0 \leq p<P}$ { snd[p] = min(src1[p], src2[p]) } |
| vopc = MAGN | $\forall_{p:0 \leq p<P}$ { snd[p] = Re(src1[p])$^2$ + Im(src1[p])$^2$ } |
| vopc = IADD | $\forall_{s:0 \leq s<P}$ { snd[s] = (s mod seg = 0) ? $\sum_{p=s}^{s+seg-1}$ src1[p] : 0 } |
| vopc = DIADD | $\forall_{s:0 \leq s<P}$ { snd[s] = (s mod seg = 0) ? $\sum_{p=s}^{s+seg-1}$ src1[p] : 0 }* |
| vopc = IMAX | $\forall_{s:0 \leq s<P}$ {snd[s] = (s mod seg = 0) ? $\text{MAX}_{p=s}^{s+seg-1}$ src1[p] : 0} |
| vopc = IMIN | $\forall_{s:0 \leq s<P}$ {snd[s] = (s mod seg = 0) ? $\text{MIN}_{p=s}^{s+seg-1}$ src1[p] : 0} |
| vopc = CIA | $\forall_{s:0 \leq s<P}$ { snd[s] = (s mod seg = 0) ? $\sum_{p=s}^{s+seg-1}$ src1[p] ⊗ src2[p] : 0 }* |
| vopc = AND | $\forall_{p:0 \leq p<P}$ { snd[p] = src1[p] & src2[p] } |
| vopc = OR | $\forall_{p:0 \leq p<P}$ { snd[p] = src1[p] \| src2[p] } |
| vopc = XOR | $\forall_{p:0 \leq p<P}$ { snd[p] = src1[p] ^ src2[p] } |
| vopc = MUL | $\forall_{p:0 \leq p<P}$ { acc[p] = src1[p] × src2[p] } |
| vopc = MAC | $\forall_{p:0 \leq p<P}$ { acc[p] += src1[p] × src2[p] } |
| vopc = SGNX | $\forall_{p:0 \leq p<P/2}$ { snd[2p] = src1[2p] }* |

*Result has double the precision of the source(s).

Most vector operations support all data types, the exceptions are listed below:
  CONJ, MAGN: only support complex data types;
  ABS, MAX, MIN, IMAX, IMIN: don't support complex data types;
  DIADD & SGNX: don't support quad word sized data types;
  CIA: only supports the complex single precision integer type;
  AND, OR, XOR: only support non-complex integers;
  NOP & SND: type is ignored.

In addition to the vector sub-operation, the AMU vector section can also receive two vector-values, from any functional unit, into the local register file ($\text{RF}_{AMU}$). The receive sub-operations are encoded in the RCV1 and RCV2 fields, and the corresponding $\text{RF}_{AMU}$ destination registers are encoded in the DST1 and DST2 fields, respectively.

| Guard | Transition |
|---|---|
| rcv1 = NONE | None |
| rcv1 = VMU | dst1 = rcv_vmu |
| rcv1 = CGU | dst1 = rcv_cgu |
| rcv1 = AMU | dst1 = snd |
| rcv1 = SFU | dst1 = rcv_sfu |
| rcv1 = SLU | dst1 = rcv_slu |
| rcv1 = SRU | dst1 = rcv_sru |
| rcv2 = NONE | None |
| rcv2 = VMU | dst2 = rcv_vmu |
| rcv2 = CGU | dst2 = rcv_cgu |
| rcv2 = AMU | dst2 = snd |
| rcv2 = SFU | dst2 = rcv_sfu |
| rcv2 = SLU | dst2 = rcv_slu |
| rcv2 = SRU | dst2 = rcv_sru |

The AMU scalar section contains the following register.

| Name | # bits | Explanation |
|---|---|---|
| bcst | 32 | Scalar broadcast register. |

The AMU scalar section can also receive a scalar-value, from the VMU, SLU or SRU, into the broadcast register (BCST). The corresponding receive sub-operation is encoded in the SRCV field.

| Guard | Transition |
|---|---|
| srcv = NONE | None |
| srcv = VMU | bcst = s_rcv_vmu |
| srcv = SLU | bcst = s_rcv_slu |
| srcv = SRU | bcst = s_rcv_sru |

The contents of the BCST register, replicated across an entire vector, can be used as an alternative SRC2 for vector operations (instead of the normal AMU registers):

| Guard | Transition |
|---|---|
| src2 = BCST | $\forall_{p:0 \leq p<P}$ { src2[p] = bcst } |

The AMU control section contains one register:

| Name | # bits | Explanation |
|---|---|---|
| segment | $\lceil ^2\log(^2\log P_s) \rceil$ | Segment size for intra-vector operations |

Shuffle Unit

Figure 9:
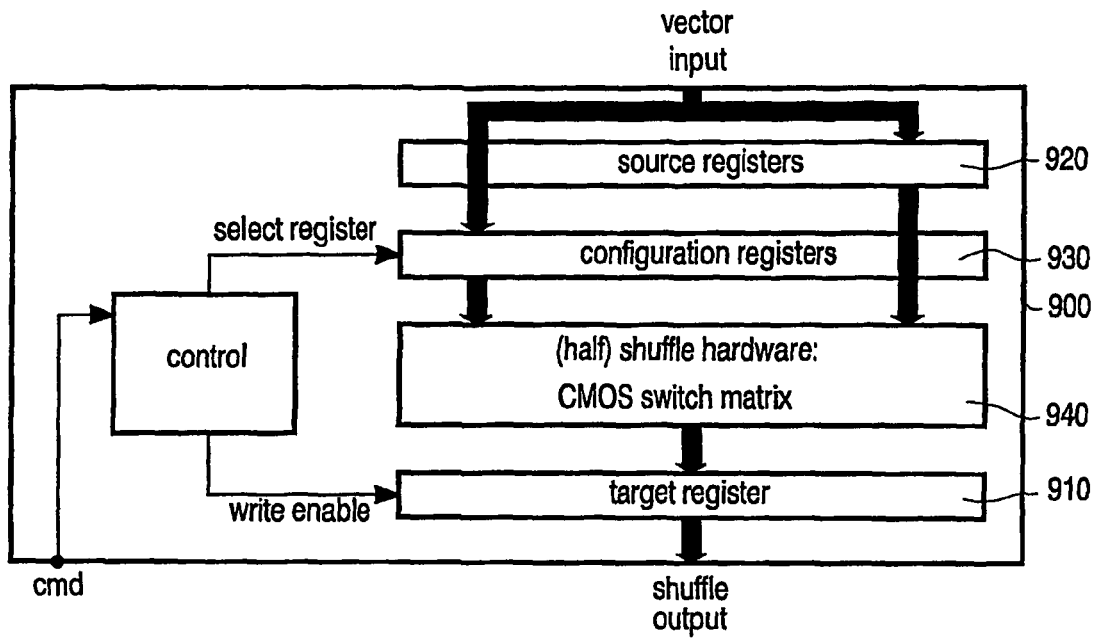
FIG. 9 shows a block diagram of the shuffle unit.

FIG. 9 shows a block diagram of the shuffle unit 900. The basic idea of the vector shuffle function is to specify for each (vector) target element 910 one (vector) source element 920. The source elements are specified in a dedicated configuration register 930. The shuffle can be specified at single word granularity (note that this also encompasses all possible double word and quad word shuffle patterns). A full shuffle can be implemented by means of a CMOS cross bar 940. Its costs are roughly proportional to the product of the number of targets and the number of sources. The realized shuffle bandwidth of $4P_Q$ words is not needed in many cases. Therefore, in the preferred embodiment only half shuffles are supported. The shuffle unit (SFU) supports up to two concurrent sub-operations:

1. a configuration or half shuffle vector operation;
2. a vector receive.

SFU_cmd=(vopc, cfg, rev)
vopc=NOP|CONF|ODD|EVEN|DUPL0|DUPL1
cfg={sfuc0, . . . , sfuc1}
rev=NONE|VMU|CGU|AMU|SFU|SLU|SRU The inputs/outputs are:

|  | Explanation |
| --- | --- |
| Input |  |
| cmd | SFU command (see instruction format for details) |
| rcv_vmu | VMU vector receive bus |
| rcv_amu | AMU vector receive bus |
| rcv_cgu | CGU vector receive bus |
| rcv_slu | SLU vector receive bus |
| rcv_sru | SRU vector receive bus |
| Output |  |
| snd | SFU vector result |

The SFU vector section contains the following register files:

| Name | # bits | Explanation |
| --- | --- | --- |
| sfu | $P_s \times 8$ | General purpose vector register |
| sfuc0, . . . , sfuc1 | $P_s \times 8$ | Vector configuration registers ($RF_{CFG}$) |

Note: There is also an implicit shuffle target register, but this is not directly accessible by the programmer. It is automatically written as a result of the various types of shuffle operations.

The SFU supports two kinds of vector sub-operations, specified in the VOPC field of the SFU instruction:

1. receive a shuffle pattern in $RF_{CFG}$ (CONF);
2. shuffle the vector in register SFU according to a pattern from $RF_{CFG}$, and store the result in the affected part of the (implicit) shuffle target register. It is possible to shuffle the odd target elements (ODD), the even target elements (EVEN), or to duplicate the source elements to both the odd and the even target elements (DUPL0 and DUPL1).

Since intermediate results are stored in the (implicit) shuffle target register, a full shuffle can be performed by sequentially performing the ODD and EVEN sub-operations. In case of a configuration sub-operation (VOPC=CONF), the CFG field of the instruction specifies which configuration register should be loaded. Otherwise it specifies which configuration register will be used as shuffle pattern.

| Guard | Transition |
| --- | --- |
| vopc = NOP | None |
| vopc = CONF | $\forall_{p:\ 0 \leq p < P}$ { cfg[p] = rcv_vmu[p] } |
| vopc = ODD | $\forall_{q:\ 0 \leq q < P/2}$ { p = 2q; if (cfg[p] ≠ −1) snd[p] = sfu[cfg[p]] } |
| vopc = EVEN | $\forall_{q:\ 0 \leq q < P/2}$ { p = 2q + 1; if (cfg[p] ≠ −1) snd[p] = sfu[cfg[p]] } |
| vopc = DUPL0 | $\forall_{q:\ 0 \leq q < P/2}$ { p = 2q; if (cfg[p] ≠ −1) snd[p] = snd[p + 1] sfu[cfg[p]] } |
| vopc = DUPL1 | $\forall_{q:\ 0 \leq q < P/2}$ { p = 2q + 1; if (cfg[p] ≠ −1) snd[p − 1] = snd[p] = sfu[cfg[p]] } |

In addition to the vector operation, the SFU also supports a vector receive operation (into the local SFU register), which is encoded in the RCV field of the instruction. Note that it is possible to receive a shuffle pattern (from the VMU) and a new shuffle source (from any other functional unit) at the same time, by combining the vector sub-operation CONF with a vector receive sub-operation.

| Guard | Transition |
| --- | --- |
| rcv = NONE | None |
| rcv = VMU | sfu = rcv_vmu |
| rcv = CGU | sfu = rcv_cgu |
| rcv = AMU | sfu = rcv_amu |
| rcv = SFU | sfu = snd |
| rcv = SLU | sfu = rcv_slu |
| rcv = SRU | sfu = rcv_sru |

Note: in combination with shift operations, the shuffle operation can be used to efficiently reorder the sparse vector elements that result from intra-vector ALU operations.

Shift-Left Unit

Figure 10:
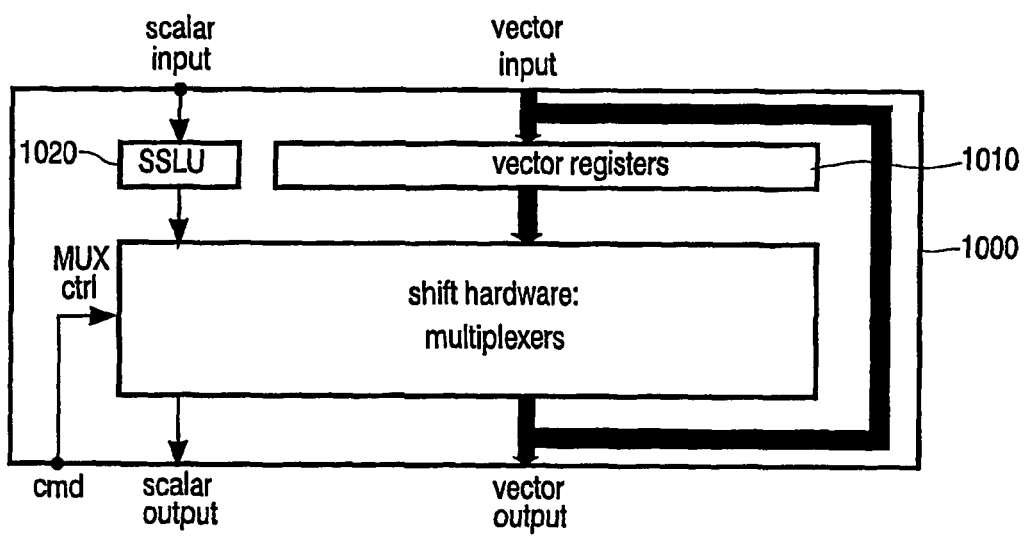
FIG. 10 shows a block diagram of the shift-left unit.

FIG. 10 shows a block diagram of the shift-left unit (SLU 1000). The SLU maintains two vector registers that can be shifted to the left by a scalar step, i.e. by one of the three scalar sizes (WORD, DWORD or QWORD). The right-hand side is either appended by 0 or by a scalar value in the local scalar receive register. The vector can be received from or sent to any functional unit. The shift-left unit (SLU) supports up to three concurrent sub-operations:

1. a vector-shift-left or send operation;
2. a vector receive operation;
3. a scalar receive operation.

SLU_cmd=(vopc, src, size, rcv, dst, srcv)
vopc=NOP|SND|SHIFT0|SHIFTS
src={slu0, slu1}
size=WORD|DWORD|QWORD
rcv=NONE|VMU|CGU|AMU|SFU|SLU|SRU
dst={slu0, slu1}
srcv=NONE|VMU|AMU|SLU|SRU The inputs/outputs are:

|  | Explanation |
| --- | --- |
| Input |  |
| cmd | SLU command (see instruction format for details) |
| rcv_vmu | VMU vector receive bus |
| rcv_amu | AMU vector receive bus |
| rcv_cgu | CGU vector receive bus |
| rcv_sfu | SFU vector receive bus |
| rcv_sru | SRU vector receive bus |
| s_rcv_vmu | VMU scalar receive bus |
| s_rcv_amu | AMU scalar receive bus |
| s_rcv_sru | SRU scalar receive bus |

-continued

| | Explanation |
|---|---|
| Output | |
| snd | SLU vector result |
| s_snd | SLU scalar result |

The vector section of the shift-left unit (SLU) contains 2 general purpose vector registers 1010:

| Name | # bits | Explanation |
|---|---|---|
| slu0, ..., slu1 | $P_s \times 8$ | General purpose vector register file $RF_{SLU}$ |

The vector-operations supported by the SLU, encoded in the VOPC field of the instruction, are:
   no-op, i.e. do not move current vector (NOP),
   send, broadcast the contents of the selected source register (SND),
   shift left, add 0 (SHIFT0),
   shift left, add scalar from the scalar receive register (SHIFTS).
The SRC field of the instruction determines which SLU register is shifted. In case of a SHIFT0 operation, the SIZE field of the instruction determines the size of the scalar step. In case of a SHIFTS operation, the scalar step size is determined by the scalar in the scalar receive register SSLU (and thus, the SIZE field is ignored).

| Guard | Transition |
|---|---|
| vopc = NOP | None |
| Vopc = SHIFT0 | $\forall_{p:\ 0 \leq p < P-1} \{ snd[p] = src[p+1] \} \wedge snd[P-1] = 0$ |
| vopc = SHIFTS | $\forall_{p:\ 0 \leq p < P-1} \{ snd[p] = src[p+1] \} \wedge snd[P-1] = sslu$ |

In addition to the vector operation, the SLU also supports a vector receive operation (into one of the local SLU registers 1010), which is encoded in the RCV field of the instruction. The DST field specifies to which local register the received vector will be written.

| Guard | Transition |
|---|---|
| rcv = NONE | None |
| rcv = VMU | dst = rcv_vmu |
| rcv = CGU | dst = rcv_cgu |
| rcv = AMU | dst = rcv_amu |
| rcv = SFU | dst = rcv_sfu |
| rcv = SLU | dst = snd |
| rcv = SRU | dst = rcv_sru |

The scalar section of the shift-left unit (SLU) contains a scalar receive register 1020:

| Name | # bits | Explanation |
|---|---|---|
| sslu | 32 (+2) | Scalar receive register (incl. size) |

The scalar shifted out of the SLU is sent to all functional units via the s_SND port. In addition, the SLU also supports a scalar receive operation (into the scalar receive register SSLU 1020), which is encoded in the SRCV field of the instruction. The scalar value in the SSLU register can be shifted into the vector from the right during the next SHIFTS vector sub-operation.

| Guard | Transition |
|---|---|
| srcv = NONE | None |
| srcv = VMU | sslu = s_rcv_vmu |
| srcv = AMU | sslu = s_rcv_amu |
| srcv = SLU | sslu = s_snd |
| srcv = SRU | sslu = s_rcv_sru |

Shift-Right Unit

Figure 11:
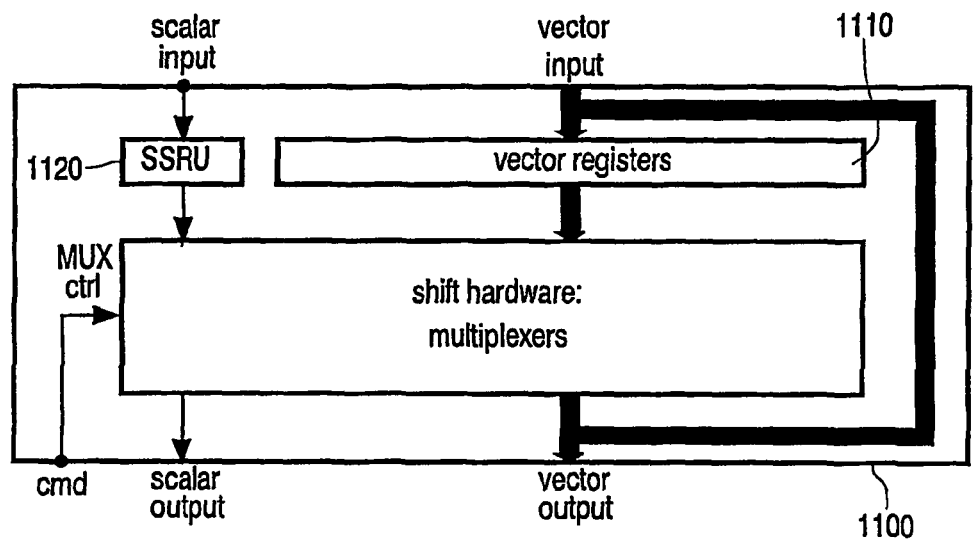
FIG. 11 shows a block diagram of the shift-right unit.

FIG. 11 shows a block diagram of the shift-right unit (SRU 1100). The SRU is similar to the SLU, except for the special receive mode (IAMU) that is used to merge the sparse results from intra-vector operations on the AMU. The shift-right unit (SRU) supports up to three concurrent sub-operations:
   a vector-shift-right or send operation;
   a vector receive operation;
   a scalar receive operation.
   SRU_cmd=(vopc, src, size, rcv, dst, srcv)
   vopc=NOP|SND|SHIFT0|SHIFTS
   src={sru0, sru1}
   size=WORD|DWORD|QWORD
   rcv=NONE|VMU|CGU|AMU|IAMU|SFU|SLU|SRU
   dst={sru0, sru1}
   srcv=NONE|VMU|AMU|SLU|SRU
The inputs/outputs are:

| | Explanation |
|---|---|
| Input | |
| cmd | SRU command (see instruction format for details) |
| rcv_vmu | VMU vector receive bus |
| rcv_amu | AMU vector receive bus |
| rcv_cgu | CGU vector receive bus |
| rcv_sfu | SFU vector receive bus |
| rcv_slu | SLU vector receive bus |
| s_rcv_vmu | VMU scalar receive bus |
| s_rcv_amu | AMU scalar receive bus |
| s_rcv_slu | SLU scalar receive bus |
| Output | |
| snd | SRU vector result |
| s_snd | SRU scalar result |

The vector section of the shift-right unit (SRU) contains 2 general purpose vector registers 1110:

| Name | # bits | Explanation |
|---|---|---|
| sru0, ..., sru1 | $P_s \times 8$ | General purpose vector register file $RF_{SRU}$ |

The vector-operations supported by the SRU, encoded in the VOPC field of the instruction, are:
   no-op, i.e. do not move current vector (NOP),
   send, broadcast the contents of the selected source register (SND),
   shift right, add 0 (SHIFT0),
   shift right, add scalar from the scalar receive register (SHIFTS).
The SRC field of the instruction determines which SRU register is shifted. In case of a SHIFT0 operation, the SIZE field of the instruction determines the size of the scalar step. In case of a SHIFTS operation, the scalar step size is determined by the scalar in the scalar receive register SSRU (and thus, the SIZE field is ignored).

| Guard | Transition |
|---|---|
| vopc = NOP | None |
| VOPC = SHIFT0 | $\forall_{p:\ 1 \leq P < P}$ { snd[p] = src[p−1] } ∧snd[0] = 0 |
| VOPC = SHIFTS | $\forall_{p:\ 1 \leq P < P}$ { snd[p] = src[p−1] } ∧snd[0] = ssru |

In addition to the vector operation, the SRU also supports a vector receive operation (into one of the local SRU registers), which is encoded in the RCV field of the instruction. The DST field specifies to which local register the received vector will be written.

| Guard | Transition |
|---|---|
| rcv = NONE | None |
| rcv = VMU | dst = rcv__vmu |
| rcv = CGU | dst = rcv__cgu |
| rcv = AMU | dst = rcv__amu |
| rcv = IAMU | dst = snd\|rcv__amu |
| rcv = SFU | dst = rcv__sfu |
| rcv = SLU | dst = rcv__slu |
| rcv = SRU | dst = snd |

The scalar section of the shift-left unit (SRU) contains a scalar receive register 1120:

| Name | # bits | Explanation |
|---|---|---|
| ssru | 32 (+2) | Scalar receive register (incl. size) |

The scalar shifted out of the SRU is sent to all functional units via the s__SND port. In addition, the SRU also supports a scalar receive operation (into the scalar receive register SSRU 1120), which is encoded in the SRCV field of the instruction. The scalar value in the SSRU register can be shifted into the vector from the left during the next SHIFTS vector sub-operation.

| Guard | Transition |
|---|---|
| srcv = NONE | None |
| srcv = VMU | ssru = s__rcv__vmu |
| srcv = AMU | ssru = s__rcv__amu |
| srcv = SLU | ssru = s__rcv__slu |
| srcv = SRU | ssru = s__snd |

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The words "comprising" and "including" do not exclude the presence of other elements or steps than those listed in a claim.

The invention claimed is:

1. A scalar/vector processor comprising:
a plurality of functional units, at least two of the functional units comprising:
a vector section for operating on at least one vector,
a corresponding scalar section for operating on at least one scalar, and
the vector section and corresponding scalar section of the functional unit co-operating by the scalar section being arranged to provide at least one scalar required by the vector section of the functional unit and consume at least one scalar supplied by the vector section of the functional unit;
wherein each of the at least two functional units comprises:
a scalar receive register in the functional unit for receiving a scalar into the functional unit,
a vector receive register in the functional unit for receiving a vector into the functional unit, and
a shared processing element connected to both the scalar receive register and the vector receive register, the shared processing element for:
receiving the scalar from the scalar receive register and the vector from the vector receive register; and
providing processing power of the vector section within the functional unit that operates on the scalar in the scalar receive register and the vector in the vector receive register, whereby the scalar section supports the operation of the vector section by at least one of supplying scalar data and consuming scalar data;
wherein the vector sections of the at least two functional units are arranged in a first pipeline and the scalar sections of the at least two functional units are arranged in a second pipeline;
wherein the scalar/vector processor is controlled by a VLIW instruction comprising separate instruction segments for each functional unit;
wherein an instruction segment for a functional unit with both a vector section and a scalar section comprises respective instructions for the vector section and for the scalar section of the functional unit.

2. A scalar/vector processor as claimed in claim 1, wherein more than one of the functional units includes a scalar section; the scalar sections of the functional units being arranged in a second pipeline.

3. A scalar/vector processor as claimed in claim 2, wherein the first pipeline and the second pipeline are independently configurable.

4. A scalar/vector processor as claimed in claim 3, wherein at least one of the first pipeline and the second pipeline is configurable on a processor instruction-by-instruction basis.

5. A scalar/vector processor as claimed in claim 4, wherein the VLIW instruction includes the configuration of the first and second pipelines.

6. A scalar/vector processor as claimed in claim 4, wherein the first pipeline includes for each vector section attached to the first pipeline a respective associated pipeline path for transferring a vector or the second pipeline includes for each scalar section attached to the second pipeline a respective associated pipeline path for transferring a scalar.

7. A scalar/vector processor as claimed in claim 5, wherein an instruction for the vector section of a functional unit specifies a pipeline path associated with a different one of the functional units for transfer of a vector or an instruction for the scalar section of a functional unit specifies a pipeline path associated with a different one of the functional units for transfer of a scalar.

8. A scalar/vector processor as claimed in claim 1, wherein at least one of the functional units is a shift unit; a vector section of the shift unit being operative to shift a vector over at least one scalar; a scalar section of the shift unit being operative to receive from the vector section at least one scalar that is being shifted in or out of the vector.

9. A processing system including a scalar processor and a scalar/vector processor as claimed in claim 1, wherein the scalar/vector processor is arranged as a co-processor to the scalar processor and the scalar processor is arranged to control the scalar/vector processor, the scalar section of the scalar/vector processor being arranged for performing in-loop scalar processing and the scalar processor being arranged for performing irregular, out-of-loop scalar processing.

10. A scalar/vector processor as claimed in claim 1, wherein the at least one functional unit comprises an ALU-MAC unit (AMU).

11. A scalar/vector processor as claimed in claim 1, wherein the at least one functional unit comprises a shift-left unit (SLU).

12. A scalar/vector processor as claimed in claim 1, wherein the at least one functional unit comprises a shift-right unit (SRU).

13. A scalar/vector processor as claimed in claim 1, comprising:
   an ALU-MAC unit (AMU) that includes a vector section and a scalar section;
   a shift-left unit (SLU) that includes a vector section and a scalar section; and
   a shift-right unit (SRU) that includes a vector section and a scalar section.

14. A scalar/vector processor as claimed in claim 1, where the first pipeline and the second pipeline are independently configurable.

15. A scalar/vector processor comprising:
a plurality of functional units, at least two of the functional units comprising:
   a vector section for operating on at least one vector,
   a corresponding scalar section for operating on at least one scalar, and
   the vector section and corresponding scalar section of the functional unit co-operating by the scalar section being arranged to provide at least one scalar required by the vector section of the functional unit and consume at least one scalar supplied by the vector section of the functional unit;
wherein each of the at least two functional units comprises:
   a scalar receive register in the functional unit for receiving a scalar into the functional unit,
   a vector receive register in the functional unit for receiving a vector into the functional unit, and
   a shared processing element connected to both the scalar receive register and the vector receive register, the shared processing element for:
      receiving the scalar from the scalar receive register and the vector from the vector receive register; and
      providing processing power of the vector section within the functional unit that operates on the scalar in the scalar receive register and the vector in the vector receive register, whereby the scalar section supports the operation of the vector section by at least one of supplying scalar data and consuming scalar data;
wherein the scalar/vector processor is controlled by a VLIW instruction comprising separate instruction segments for each functional unit;
wherein an instruction segment for a functional unit with both a vector section and a scalar section comprises respective instructions for the vector section and for the scalar section of the functional unit.

* * * * *